US005586288A

United States Patent [19]
Dahlberg

[11] Patent Number: 5,586,288
[45] Date of Patent: Dec. 17, 1996

[54] MEMORY INTERFACE CHIP WITH RAPID SEARCH CAPABILITY

[75] Inventor: Bjorn Dahlberg, Irvine, Calif.

[73] Assignee: Hilevel Technology, Inc., Tustin, Calif.

[21] Appl. No.: 125,315

[22] Filed: Sep. 22, 1993

[51] Int. Cl.$^6$ .............................. G06F 12/00; G06F 7/20; G11C 15/00
[52] U.S. Cl. .................... 395/435; 365/49; 340/146.2
[58] Field of Search .................... 395/435, 427; 340/146.2; 364/715.11; 365/49; 382/10, 33, 34

[56] References Cited

U.S. PATENT DOCUMENTS

| | | | |
|---|---|---|---|
| 3,609,703 | 9/1971 | Peacock | 340/146.2 |
| 4,032,885 | 6/1977 | Roth | 364/715.11 |
| 4,053,871 | 10/1977 | Vidalin et al. | 340/146.2 |
| 4,097,844 | 6/1978 | Moyer | 340/146.2 |
| 4,101,903 | 7/1978 | Slay | 346/33 R |
| 4,119,946 | 10/1978 | Taylor | 382/222 |
| 4,334,284 | 6/1982 | Wong | 364/748 |
| 4,383,304 | 5/1983 | Hirashima | 364/715.08 |
| 4,433,392 | 2/1984 | Beaven | 395/600 |
| 4,443,860 | 4/1984 | Vidalin | 395/600 |
| 4,464,718 | 8/1984 | Dixon et al. | 395/600 |
| 4,467,444 | 8/1984 | Harmon, Jr. et al. | 395/375 |
| 4,468,730 | 8/1984 | Dodd et al. | 395/440 |
| 4,524,345 | 6/1985 | Sybel et al. | 364/715.11 |
| 4,550,436 | 10/1985 | Freeman et al. | 382/218 |
| 4,560,974 | 12/1985 | Coleman et al. | 340/146.2 |
| 4,575,818 | 3/1986 | Almy et al. | 365/49 |
| 4,631,696 | 12/1986 | Sakamoto | 364/748 |
| 4,639,886 | 1/1987 | Hashimoto et al. | 364/736 |

(List continued on next page.)

OTHER PUBLICATIONS

PAL® (Programmable Array Logic) Devices. HAL® (Hard Array Logic) Devices, Monolithic Memories (undated), pp. 5-17 to 5-20, 5-22, 39, 46, 65, 68 and 86.

Gersbach, J. E., "Algebraic/Logical Shift Matrix," *IBM Technical Disclosure Bulletin*, vol. 23 No. 1, Jun. 1980, pp. 120-122.

Texas Instruments, Types SN54LS381a SN54LS382, SN54S381, SN74LS381A, SN74LS382, SN74S381 *Arithmetic Logic Units/Functions Generators*, pp. 3-1037 to 3-1041.

Brady, J. T., "Instruction for Text Manipulation (Find Long)," IBM Technical Disclosure Bulletin, vol. 27 No. 7A, Dec. 1984, pp. 3984-3989.

Padilla, Maria, "Methvin in up to BAT," *The Orange County Register*, Feb. 20, 1987, pp. C1 and C10.

Manuel, Tom, *"The Frantic Search for More Speed," Electronics*, Sep. 3, 1987, pp. 59-73.

Weiss, Ray, "Methvin Develops 64–Bit Mini," *Electronic Engineering Times*, Sep. 21, 1987, p. 47.

Primary Examiner—Glenn Gossage
Attorney, Agent, or Firm—Christie, Parker & Hale, LLP

[57] ABSTRACT

A memory interface chip with rapid search capability incorporates multiple registers to latch data from a memory under control of a microprocessor and to permit comparison of search strings and masking or special comparison characters provided by a processor with data from the memory. The memory interface chip includes a first register having a first plurality of storage locations for storing a target search string, and a second register having a second plurality of storage locations for receiving data in parallel from the memory. A plurality of comparators connected to the registers compares the search target string to data from the memory. Each column of comparators feeds forward a positive compare result from any comparator in the column to an AND gate receiving the output of the next sequential comparator in the next column of comparators, thereby allowing confirmation of the positive comparisons of the target string by the comparator columns. A positive compare of all bytes in the target string is created by a positive signal from the last AND gate in a cascade associated with the comparator column providing a positive compare of the last character of the target string. The memory interface chip may be provided with additional compare registers for skip, mask, wild card, or other special character inputs for special control of the compare string.

9 Claims, 26 Drawing Sheets

U.S. PATENT DOCUMENTS

| | | | |
|---|---|---|---|
| 4,847,877 | 7/1989 | Besseyre | 375/368 |
| 4,857,882 | 8/1989 | Wagner et al. | 340/146.2 |
| 4,896,133 | 1/1990 | Methvin et al. | 340/146.2 |
| 4,907,194 | 3/1990 | Yamada et al. | 365/49 |
| 4,928,260 | 5/1990 | Chuang et al. | 365/49 |
| 4,996,666 | 2/1991 | Duluk, Jr. | 365/49 |
| 5,051,947 | 9/1991 | Messenger et al. | 395/800 |
| 5,073,864 | 12/1991 | Methvin et al. | 364/715.11 |
| 5,077,658 | 12/1991 | Bendert et al. | 395/600 |
| 5,161,230 | 11/1992 | Carter et al. | 395/800 |
| 5,175,860 | 12/1992 | Yamada | 395/800 |
| 5,319,762 | 6/1994 | Mayer | 395/435 |
| 5,321,843 | 6/1994 | Shoji et al. | 395/800 |
| 5,379,420 | 1/1995 | Ullner | 395/600 |

Fig. 24
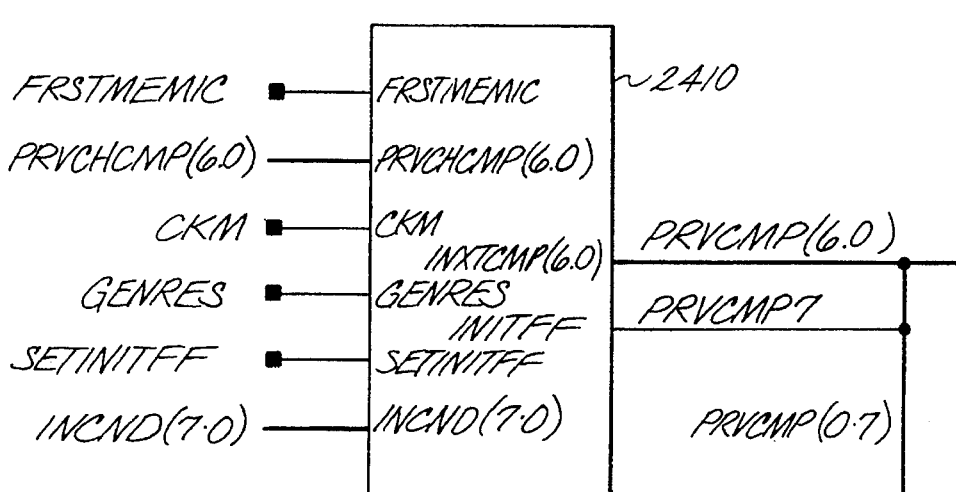
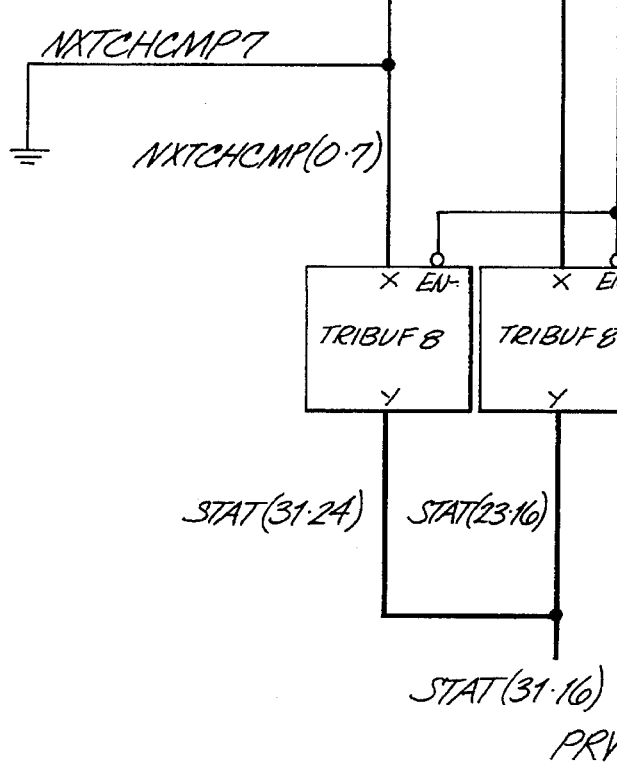

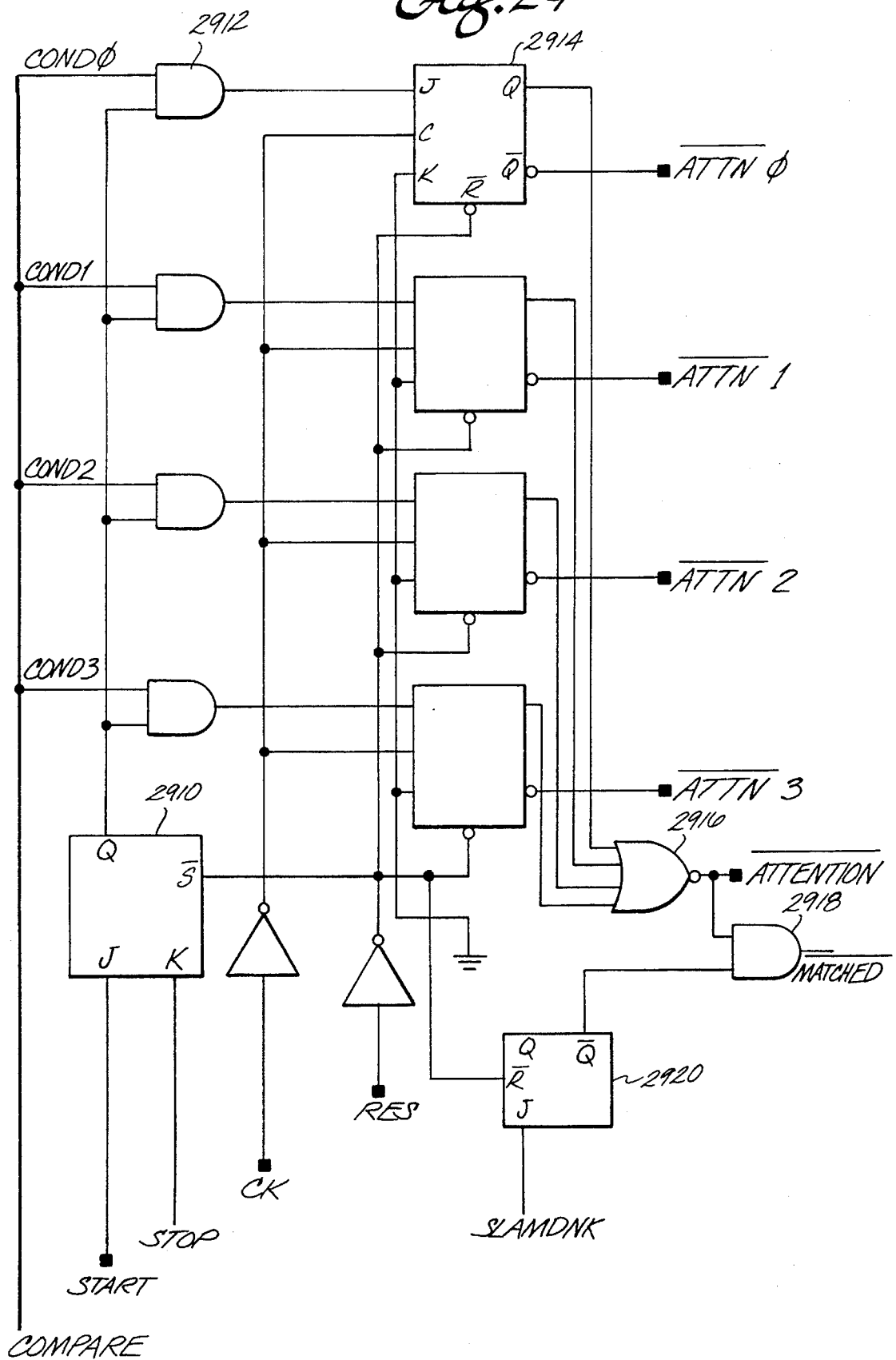

MEMORY INTERFACE CHIP WITH RAPID SEARCH CAPABILITY

BACKGROUND OF THE INVENTION

1. Field of the Invention

The present invention relates to search engines for rapid text or data search from a memory or storage device. In particular, the present invention provides the capability for parallel examination of a plurality of data bytes with a predetermined character string. The comparison is conducted without required reference to position in the string and is insensitive to word boundaries through the use of a feed forward of comparison hits creating a sequence of successive hits for a successful compare to the search string. Addition of masking characters, skip characters and wildcard characters as control elements for the detection sequence provides additional flexibility for the search engine.

2. Prior Art

As database size has increased and the requirements for searching for specific data patterns, whether in the form of character strings or binary data, the need for rapid search capability has increased. Exemplary techniques for searching character strings have typically relied on a serial assessment of a target string of characters, comparing a serial flow of data to the first character in the string and, upon receiving a positive compare, advancing to the second character to compare the next serial character in the incoming data. If a positive compare on the second character is not received, the search retreats back to the first character continuing the serial search.

Various means to perform some portions of the search in parallel have been disclosed in the prior art. U.S. Pat. No. 4,053,871 to Vidalin, et al. discloses a method and system for iterative and simultaneous comparison of data with a group of reference data items. However, the Vidalin system is specifically restricted to a particular format of data entry to allow parallel comparison of sequential data appearing in each element of the format. For highly structured databases, the Vidalin device provides the necessary enhancement, however, the system is inoperable for unstructured data.

U.S. Pat. No. 4,433,392 to Beaven discloses a system less sensitive to data structure, however, while comparisons are conducted in parallel in the Beaven device, data transfer is conducted serially thereby severely limiting the search speed. A similar device disclosed in U.S. Pat. No. 4,847,877 to Besseyre enhances speed of detection during serial bit transmission by detecting data in frames comprising more than a single element of the search pattern thereby allowing cessation of search on a frame once a dissimilarity has been identified. While the Besseyre approach improves on the overall speed of the Beaven device, serial transmission of the data to be searched ultimately limits the search speed.

U.S. Pat. No. 4,550,436 to Freeman et al. discloses yet another device which operates to provide a parallel comparison of incoming data with a serially supplied search string, again providing termination of the search upon failure to obtain a second match after a first match has been obtained.

The present invention overcomes the shortcomings of the prior art by providing a true parallel comparison of both the search string and data retrieved from the memory or storage device while maintaining flexibility for insertion of masking or skipping of special characters and examination for wildcard characters to accommodate various potential forms of the data being searched. The present invention provides for up to four skip characters thereby overcoming the issues of word searching with hyphenation.

SUMMARY OF THE INVENTION

The present embodiment of the invention operates for searching of a random access memory with depth of from one (1) mega-byte to sixteen (16) giga-bytes by 128 bits wide. Four memory interface chips (MEMIC) are interfaced to the 128 bit wide memory through a memory bus. A plurality of registers in each MEMIC latch data from the memory bus for use in the system. Each MEMIC captures 32 bits of data for processing. The MEMICs of the present invention operate under control of a 32 bit microprocessor which provides data transfer through a processor bus. Each MEMIC contains a plurality of registers connected to the processor bus to latch data from the bus for use in the MEMIC. A first plurality of multiplexers is connected intermediate the memory bus and the outputs of the memory registers and bus register for selection of data returned from the MEMIC to the memory bus. A second plurality of multiplexers is connected intermediate the processor bus and the memory registers and bus registers for selection of data to be returned to the processor bus from the MEMIC. A third plurality of multiplexers is connected intermediate an internal chip bus for the MEMIC and the memory registers and bus registers for selection of data to be placed on the chip bus. This arrangement allows the memory interface chips incorporating the present invention to act as memory registers for the microprocessor to facilitate interleaving of memory access.

The search function of the present invention is incorporated in the MEMIC through a first plurality of compare registers which receive the search target string through the chip bus and bus registers from the processor bus. A plurality of comparators connected to the compare registers and the memory registers compares the target string to data from the memory. The plurality of comparators is equal in number to the plurality of compare registers times the number of memory registers thereby allowing parallel comparison of each target byte (or bit) and the bytes received in parallel from memory by the MEMIC. Each column of comparators comparing the target string to individual bytes from the memory registers feeds forward a positive compare result from any comparator in the column to an AND gate receiving the output of the next sequential comparator in the next column of comparators. A successful compare in that comparator is similarly forwarded through the AND gate to a second AND gate associated with the next comparator column and subsequent comparator. Cascading of the AND gates for the comparator columns, as identified, allows sequential confirmation of positive comparisons of the target string by the comparator columns. A hit, resulting from a positive compare of all bytes in the target string, is created by a positive signal from the last AND gate in a cascade associated with the comparator column providing a positive compare of the last character of the target string.

The output of the AND gate cascade for each MEMIC is provided to the input of the AND gate cascade for the subsequent MEMIC thereby allowing comparison without regard to word boundary of the data received from memory or MEMIC boundary. Comparison results present in the AND gate cascade of the last MEMIC are provided to the first MEMIC at the same time the memory registers are loaded with a new data string for comparison. This allows the search to be transparent to data boundaries of the loaded data from memory.

The invention further provides a second plurality of skip compare registers receiving data from the processor bus through the bus registers and chip bus to latch skip characters to be ignored during target string search. The invention also includes a third plurality of special character compare registers receiving data from the processor bus through the bus registers and chip bus to latch special characters for comparison in the search string and a fourth plurality of mask registers receiving data from the processor bus through the bus registers and chip bus to latch mask instructions for the target search string. A fifth plurality of wild-card registers receives data from the processor bus through the bus registers and chip bus to latch wild-card characters for placement in the search string to allow arbitrary character presence at desired locations in the search string. A plurality of comparators intermediate the plurality of skip character registers and the AND cascade, a plurality of comparators intermediate the wild-card character registers and the AND cascade, and a plurality of comparators intermediate the mask registers and the AND cascade, compare skip, wild-card and mask characters to the data in the memory registers for forcing appropriate elements of the AND cascade to a true condition when skip, wild-card or mask characters are encountered. A plurality of comparators receiving input from the special character registers and memory registers provides a signal for implementing a special effect upon a positive compare with a special character. The special effect signal is employed in controlling the MEMIC operation. Multiple special character comparator sets are provided to allow multiple special character effect signals to be generated for differing special characters.

A control register is provided in the inventions for latching data from the processor bus to enable and control the registers and comparators.

The invention provides a self-aligned, simultaneous parallel string comparator with built in combinational tree mechanism for handling of hyphenation.

BRIEF DESCRIPTION OF THE DRAWINGS

The present invention will be better understood with reference to the following drawings and accompanying detailed description:

FIG. 24 is detailed block diagram of the data forwarding and initial condition circuit of FIG. 14;

FIG. 29 is a detailed logic diagram of the status output of FIG. 26.

DETAILED DESCRIPTION

Figure 1:
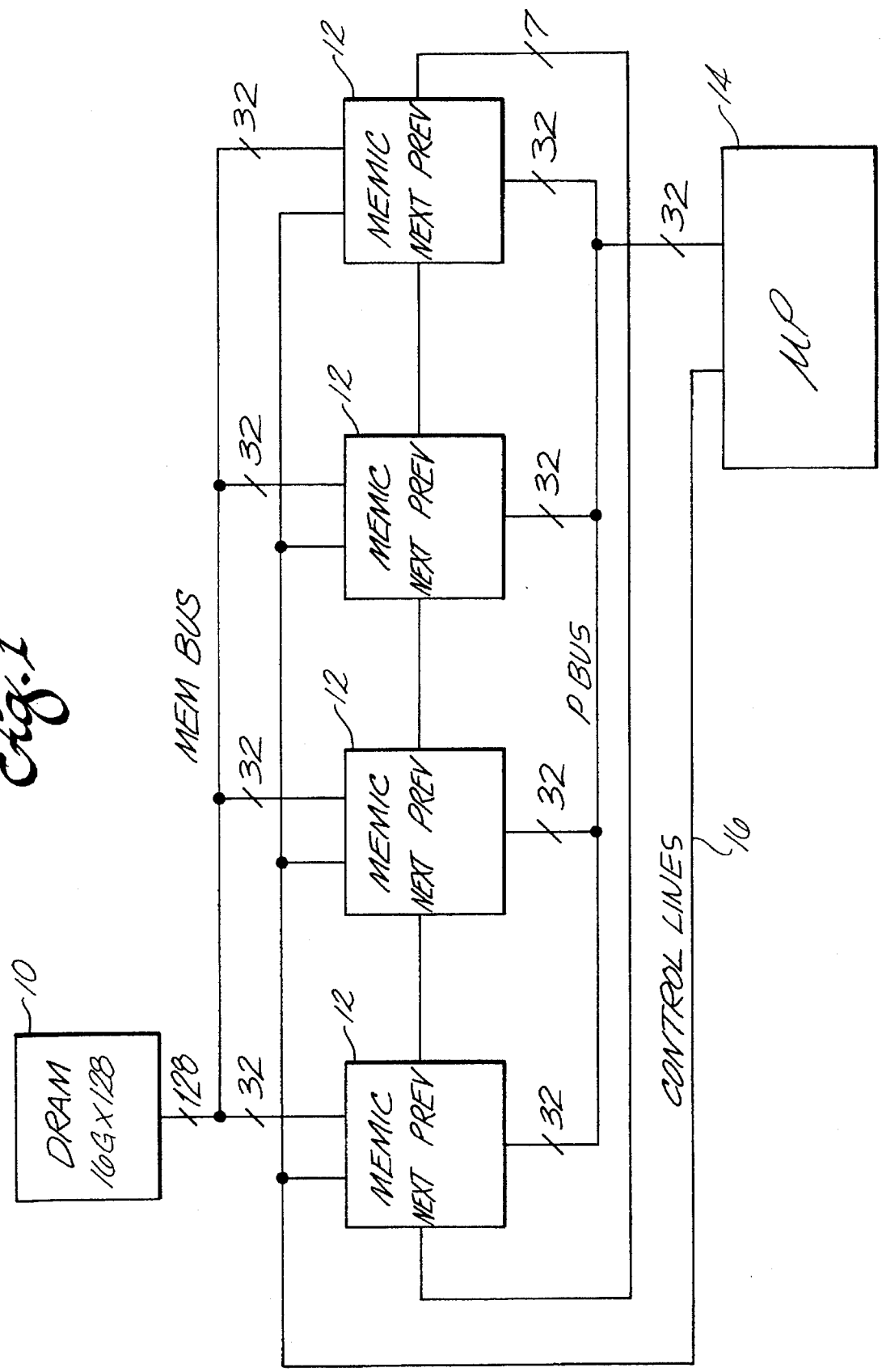
FIG. 1 is a block, diagram of an embodiment of the memory interface chip of the present invention with a dynamic random access memory under the control of a microprocessor.

The present invention is directed to a memory interface chip (MEMIC) which provides memory registers and simultaneous parallel searching of text strings. FIG. 1 shows an implementation of the MEMIC in a typical embodiment. A dynamic random access memory (DRAM) 10 is structured) in the embodiment shown, with 128 bit width. A memory bus (MEMBUS) connects the DRAM to four MEMICS 12. A microprocessor 14 is connected to the MEMICs by a processor bus (PBUS) for data transfer and a plurality of control lines 16 to be discussed in greater detail subsequently.

Figure 2:
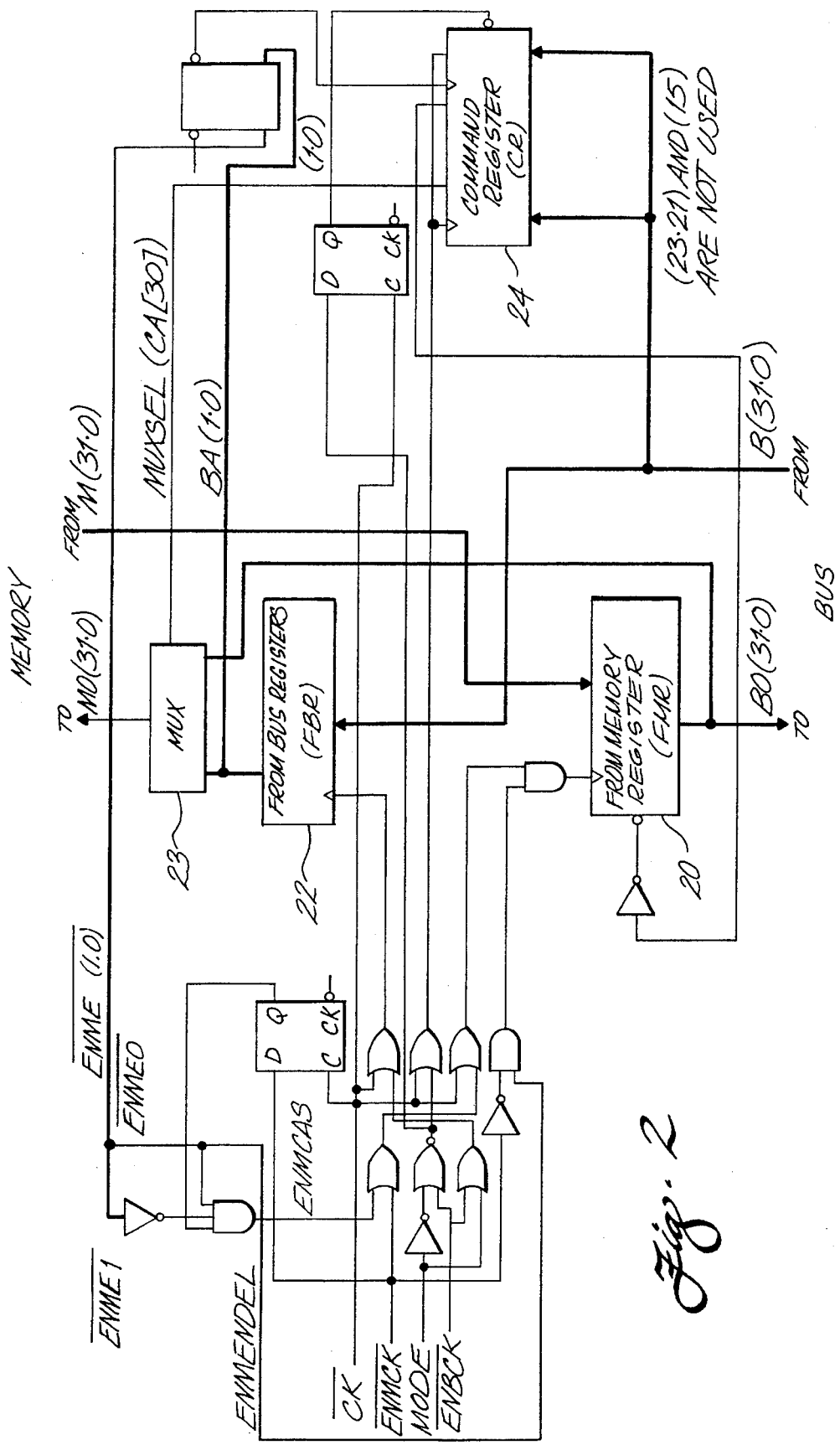
FIG. 2 is a block diagram of the general relationship for registers receiving data from the memory, registers receiving data from the bus, command register and multiplexers for data transmission.

The first function of the MEMIC is accomplished through the register structure shown in FIG. 2. Data arriving on MEMBUS from the memory is received in "from memory registers" (FMR) 20. Similarly data received from the PBUS resides in the "from bus registers" (FBR) 22. A multiplexer 23 is connected intermediate the outputs of the FBR and FMR and the MEMBUS to allow data from the registers to be returned to the memory. The MEMIC may, therefore, be employed as a buffer register by the microprocessor to facilitate interleaving of memory accesses. Control of the multiplexer and FMR is accomplished through a command register (CR) 24. Operation of the CR will be described in greater detail subsequently. Clocking of the present invention shown in the embodiment of FIG. 2 is accomplished employing a clock signal $\overline{CK}$ as a standard chip clock. Operation of the present invention with a DRAM employing CAS/RAS timing is integrated through use of a two-bit enable memory (ENMEN) command provided from the CR. Direct enable signals from the microprocessor to enable a bus clock $\overline{ENBCK}$ and enable the memory clock $\overline{ENMCK}$ in combination with a mode signal, allow selection of operation by the MEMIC employing the CAS of the DRAM for loading of the FMR. Control signals $\overline{ENBCK}$, and MODE are used to load data from the PBUS onto the FBR. Loading of the FMR register is accomplished using signals $\overline{ENMCK}$ and $\overline{CK}$. The first bit of the ENMEN control signal designated ENMENDEL provides a delay of one clock cycle for the $\overline{ENMCK}$ signal. The second memory control bit designated ENMCAS allows the CAS signal of the DRAM to effectively become a clock for the FMR.

Figure 3:
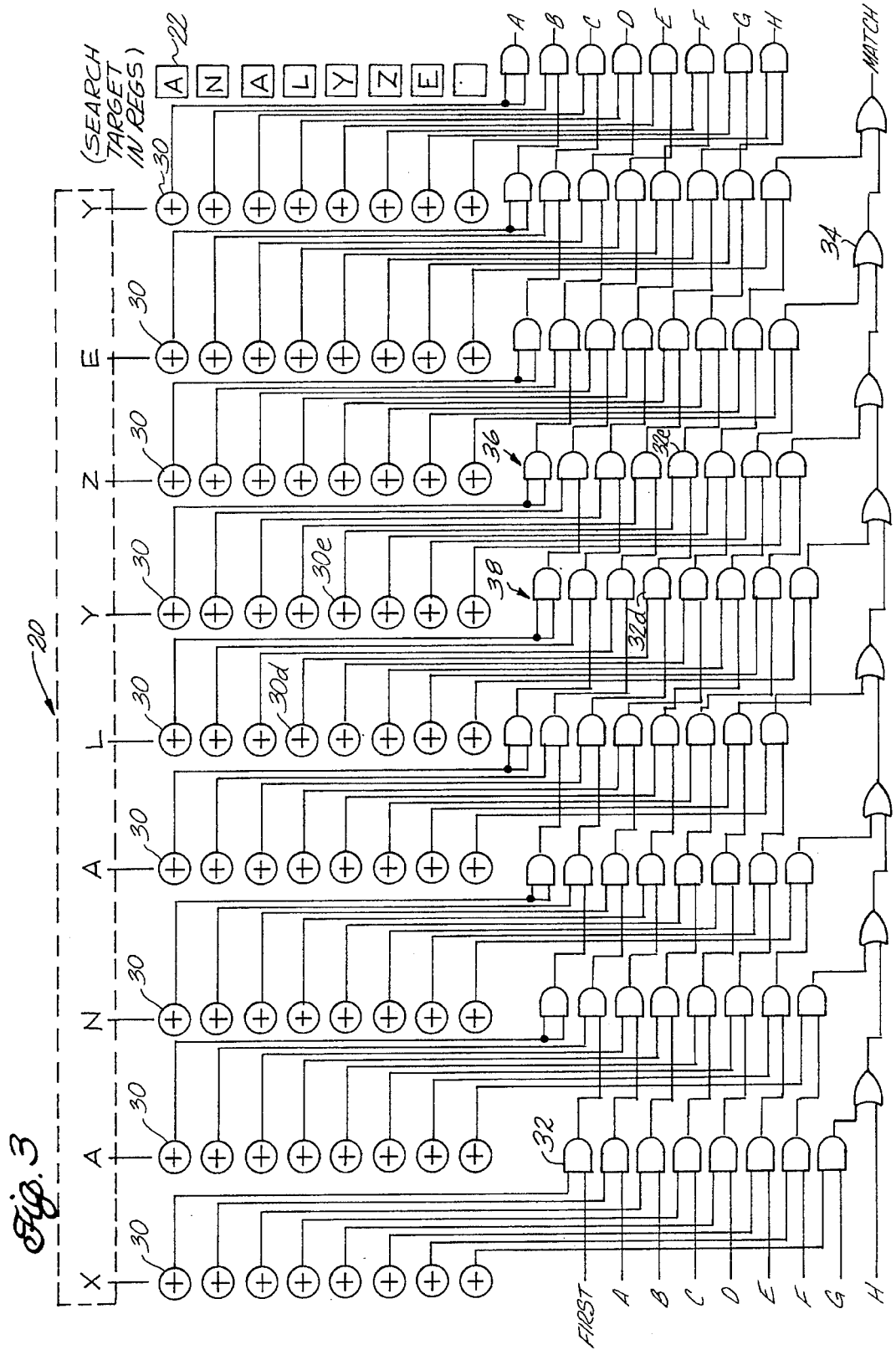
FIG. 3 is a generalized block diagram of the compare structure and feed forward positive match structure for comparison of a search target with multiple bytes of data from the memory in parallel.

The search function of the MEMIC is shown schematically in FIG. 3. A string of characters comprising the search target are received by the MEMIC from the microprocessor and placed in the FBR. Specific locations and identification of registers will be provided in greater detail subsequently. In the embodiment shown in FIG. 3, the target string comprises the word ANALYZE which is identified in blocks generally representing the FBR 22. Data to be searched arrives from the DRAM on the MEMBUS and is loaded into the FMR, generally designated in FIG. 3 as 20. A matrix comprising a plurality of comparators 30 compares data from the search string to data in the FMR on a massively parallel basis. The matrix of comparators is arranged in columns and rows having a total number of rows equal to the number of bytes (or bits) in the search target register and the columns are of equal number to the number of bytes in the FMR.

In the embodiment of the invention shown in FIG. 1, each MEMIC is 32 bits wide and the search target register incorporates the capability for 8 characters. The choice of 8 consecutive characters for the search string has been selected to confine false "hits" to a minimum, yet maintain a size which is economically attractive for implementation. The 128 bits (16 bytes) for the memory and consequently the MEMBUS provide adequate size for interleaving memory to reduce memory access time and provide a significant parallelism in the search. The four MEMICS of 32 bits, consequently, each receive four characters from the FMR for comparison to the target string. The FBR containing target search string is reproduced in each MEMIC for the comparison. The schematic representations of FIG. 3 demonstrates the capability of the present invention for crossing hardware boundaries with the search approach.

The third basic element of the search system is a matrix of AND functions shown in FIG. 3 as AND gates 32 which receive an output from the comparator matrix designating positive comparisons with the target string. The AND function/gates feed forward from each comparator column to the next column to confirm the sequence of comparison for the entire search string. As an example, examining the column for the letter Y in the FMR, the fifth comparator in column 34 provides a positive compare based on the presence of a Y in the target search string at that location. The result of the positive compare is provided to the AND function/gate in column 36 which receives as its second input the output from the AND function/gate in column 38 associated with the previous or adjacent row and column. The AND function/gate in column 38 had in turn received a first input from the comparator 30D in the prior column and row which compares the letter L in the FMR with the corresponding letter in the target search string. Since a positive compare is also present on register 30D, a true signal is fed to AND gate 32D which, if passed, will be provided to the second input of AND function/gate 32E allowing the positive result of the compare with the character Y to be passed to the next set of AND functions/gates corresponding to the next column of comparators.

This cascading of AND functions/gates interrupts the comparison of the string at any point where a miscompare is received. However, if the entire search string is present in the FMR as shown in FIG. 3, the positive compare from the column containing the first character in the search string is fed through its associated AND function to the AND function/gate associated with the second comparator in the next column. Similarly, if the result of that compare is positive the result is fed by the AND function/gate the next AND function/gate in the cascade corresponding to the third comparator of the next column. If all characters in the search string result in a positive compare, the AND function/gate corresponding to the last comparator in the column of the last character location in the search string (the bottom row) will provide a true result designating a positive compare. To alleviate sensitivity to boundaries of the data in the FMR, the positive result from the final AND function/gate in the cascade of any positive compare is provided to an OR function/gate 34 "tripping" the remainder of the AND function cascade to force a positive result on a match output. This approach of forward passing of matches is the essence of the search technique in the present invention. It automatically aligns characters without regard to word boundary in the FMR or MEMIC boundary and, as will be discussed in greater detail subsequently, allows crossing of the FMR boundary between sets of 16 character strings to be searched through a wrap around of the output of the AND cascade from the last MEMIC to the first MEMIC in the system.

Summarizing the search strategy in the embodiment shown in the drawings, 16 characters (128 bits) are provided in parallel on the MEMBUS to the FMR. These 16 characters are simultaneously compared against eight characters of the search string present in the FBR of each MEMIC by the comparator matrix. The result of each comparison is dependent on the result of the comparison of the previous character and so on. Each character hit is fed forward in the AND function cascade for comparison with the next character. Positive compare of all eight characters in sequence results in a signal output from the cascade which is then provided to a string of OR gates corresponding to each column in the cascade to carry the positive match through the remainder of the AND function cascade.

While the search structure as defined with regard to FIG. 3 is transparent to hardware MEMIC boundaries and word boundaries in the data provided to the FMR, practical effects of blocks and page sizing in memory organization and generalized searching conditions for text searches wherein capitalizations, hyphenated breaking of text, multiple spellings and other search sensitive contextual matters need to be accounted for. In the embodiment of the invention shown in the drawings and discussed in detail subsequently, the masking of various bits of the data searched provides the capability for avoiding upper/lower case sensitivity and other data comparison functions. Special compare characters are employed for skips to accommodate contextual characters such as hyphenation (possibly followed by line feed and carriage return). Such characters in normal text may be eliminated by assigning skip characters with those values which are ignored during the comparison to the search target string. Similarly, wild-card characters are employed for positional comparison with respect to the target text string for spelling differences such as "ANALYZE" and "ANALYSE" or abbreviation such as "FIGURE" and "FIG." In the former case, the wild-card character merely substitutes for the character in the search string while in the abbreviation case, the wild-card character results in a match without comparison with the remainder of the string.

A "SLAM-DUNK" character is employed for control of the system when a positive compare is obtained with the SLAM DUNK character. Similarly, START/STOP characters are employed for initiating and terminating searching with the target string based on receipt of the special characters.

While the target search string has been defined as eight characters, the capability for searching on fewer characters is accommodated by employing a length vector for the search string.

The present invention as embodied in the drawings provides an eight character search which is supplemented for longer character strings by direct analysis in the microprocessor. The present invention, for example, provides rapid data search for the first eight characters of a sentence in stored text. Upon a match with those first eight characters, the microprocessor serially analyzes remaining characters in the sentence for a match or uses other appropriate searching technique.

Figure 4:
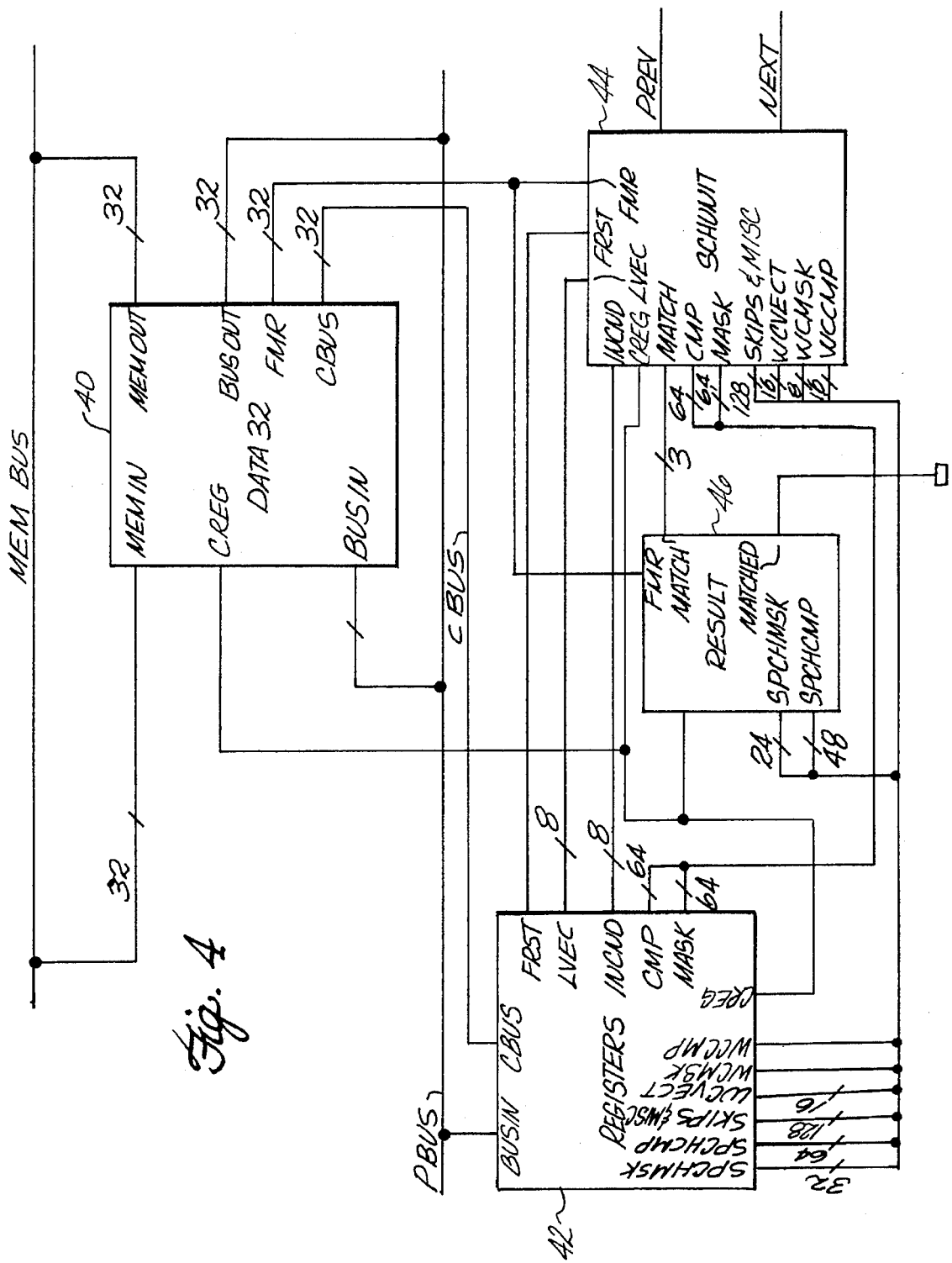
FIG. 4 is a block diagram of the elements of a memory interface chip according to the present invention.

An embodiment of the MEMIC employing the invention is shown in detail in FIG. 4. The MEMIC comprises a data handling circuit (DATA32) 40 which incorporates the FMR 20 and multiplexer 23 previously described with respect to FIG. 2. The DATA32 communicates with the DRAM through the MEMBUS through memory input MEMIN and memory output MEMOUT. Communication with the PBUS is accomplished in the DATA32 through bus input BUSIN and bus output BUSOUT. Finally, communication internal to the MEMIC is provided on a chip bus CBUS.

The registers 42 for the MEMIC include the FBR and CR of FIG. 2. A search unit (SCHUNIT) 44 incorporates the comparators and comparison feed forward cascade. Finally, a result circuit 46 provides the ultimate output for a match on the search which concludes on the MEMIC. The result circuit also provides special character control functions for search start, search stop and slam dunk operations.

Figure 5:
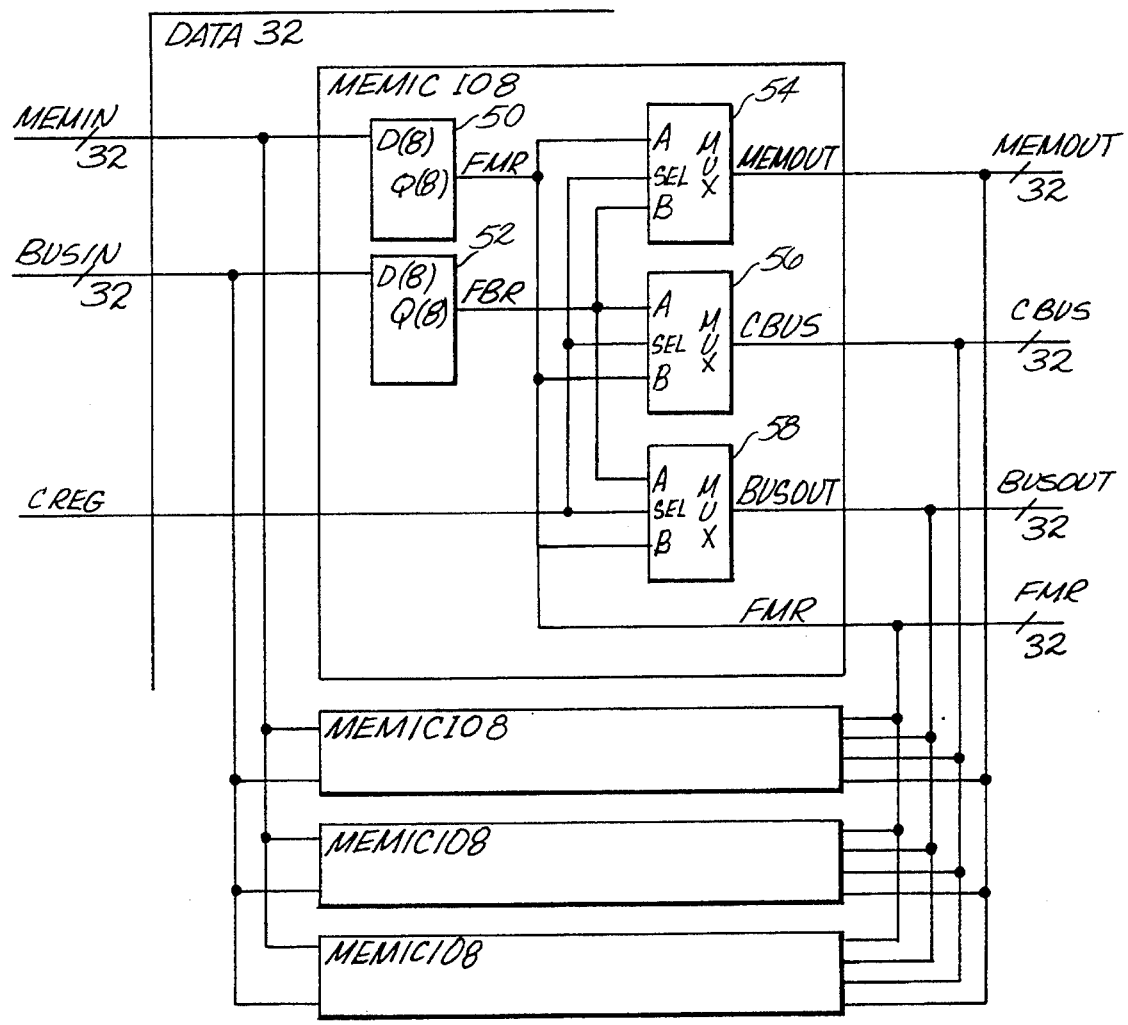
FIG. 5 is a detailed block diagram of the data input and output structure for the memory interface chip.

As shown in FIG. 5 the DATA32 comprises four identical eight bit circuits MEMICIO8 which incorporate latches 50 receiving data from port MEMIN and act as the FMR. Similarly, latches 52 receive data from port BUSIN to act as the FBR. A first multiplexer 54 selects between the FMR and FBR providing data output to the DRAM on port MEMOUT. A second multiplexer 56 selects data from the FMR or FBR for output to the CBUS for internal use on the MEMIC. A third multiplexer 58 selects data from the FMR or FBR for output to the PBUS on the BUSOUT port. Data from the FMR latch is provided on port FMR for use in the SCHUNIT and RESULT circuit.

Figure 6:
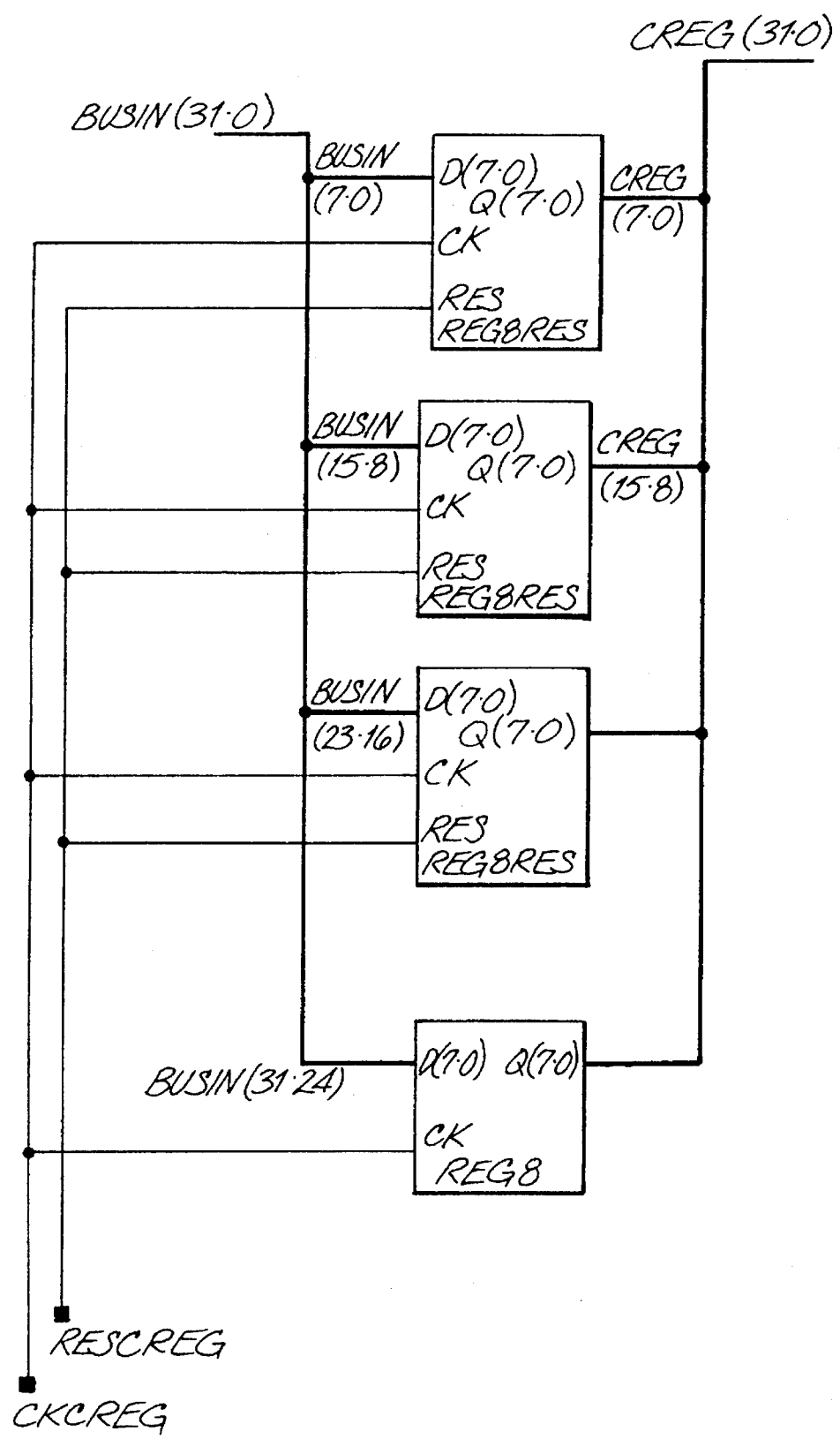
FIG. 6 is a block diagram of the command register.

FIG. 6 shows in detail the command register CR in the registers block 42 of FIG. 4. The CR comprises three resettable eight bit registers REG8RES for command strobe bits and an eight bit latch REG8 for multiplex control signals. The resettable registers and latch receive data from the microprocessor for control of the MEMIC on BUSIN. Output from the CR is provided on CREG.

Figure 7:
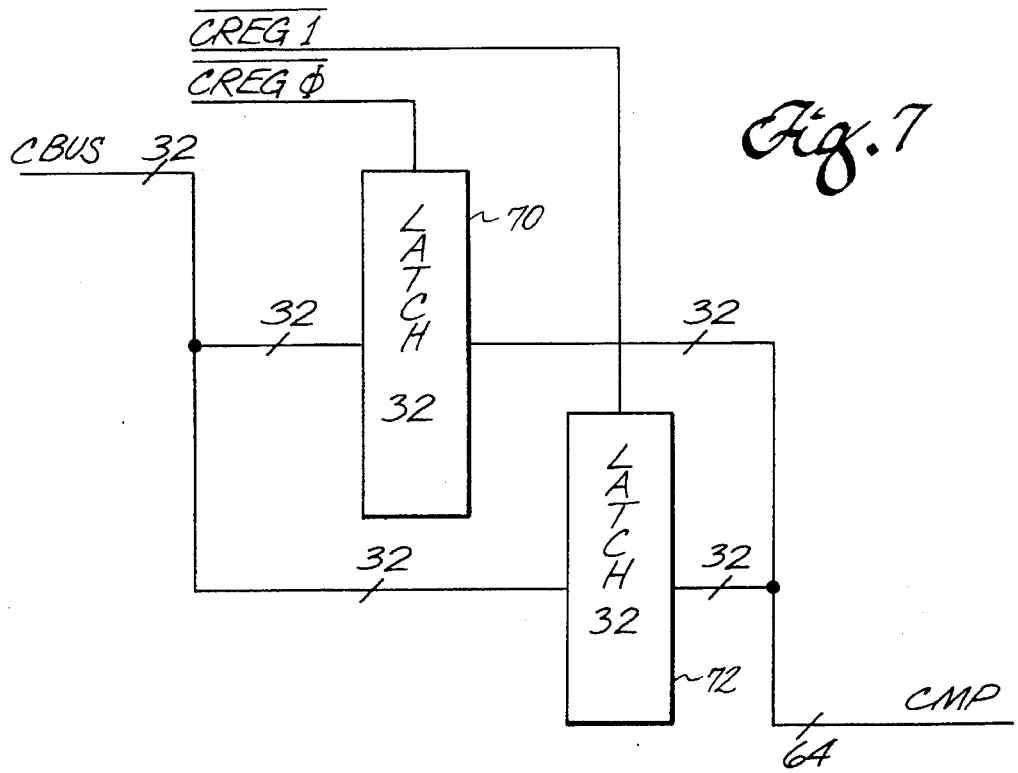
FIG. 7 is a block diagram of the compare registers for storage of the search target string.

Individual latches incorporated in the registers of FIG. 4 are shown in FIGS. 7 through 13. FIG. 7 shows the 32 bit latches 70 and 72 which receive, in 32 bit increments from CBUS, the eight characters of the target string for search comparison. The target string is provided from the latches on 64 bit output CMP. Control of the latches is accomplished by bits 0 and 1 from the CR designated $\overline{CREG1}$ and $\overline{CREG0}$. Buffering of various register and bus signals has not been shown in the drawings for clarity. Those skilled in the art will recognize that proper signal distribution internal to the chip may incorporate primary and negated signals and bus buffering may provide separate sub-buses for transmission of the data.

Figure 8:
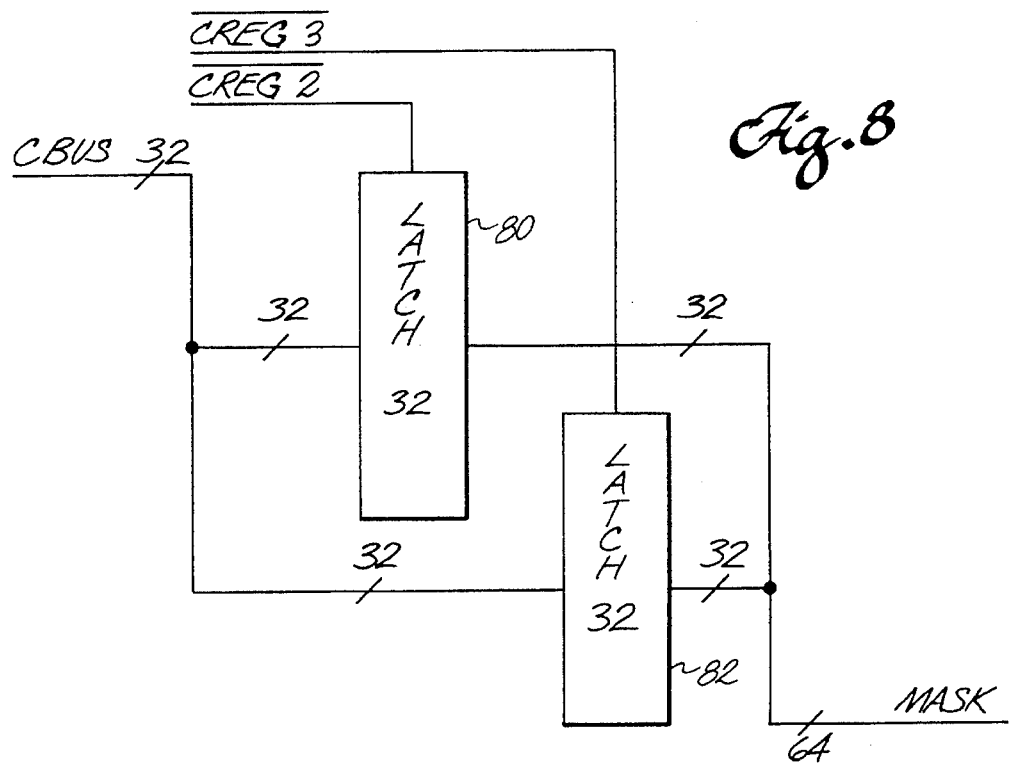
FIG. 8 is a block diagram of the registers for storage of mask bits.

FIG. 8 discloses latches 80 and 82 which receive masking data from the CBUS in 32 bit increments. Mask bits for the data to be compared to the target string are provided on 64 bit output MASK. Latching of the mask registers is accomplished by CR bits 2 and 3 designated $\overline{CREG2}$ and $\overline{CREG3}$.

Figure 9:
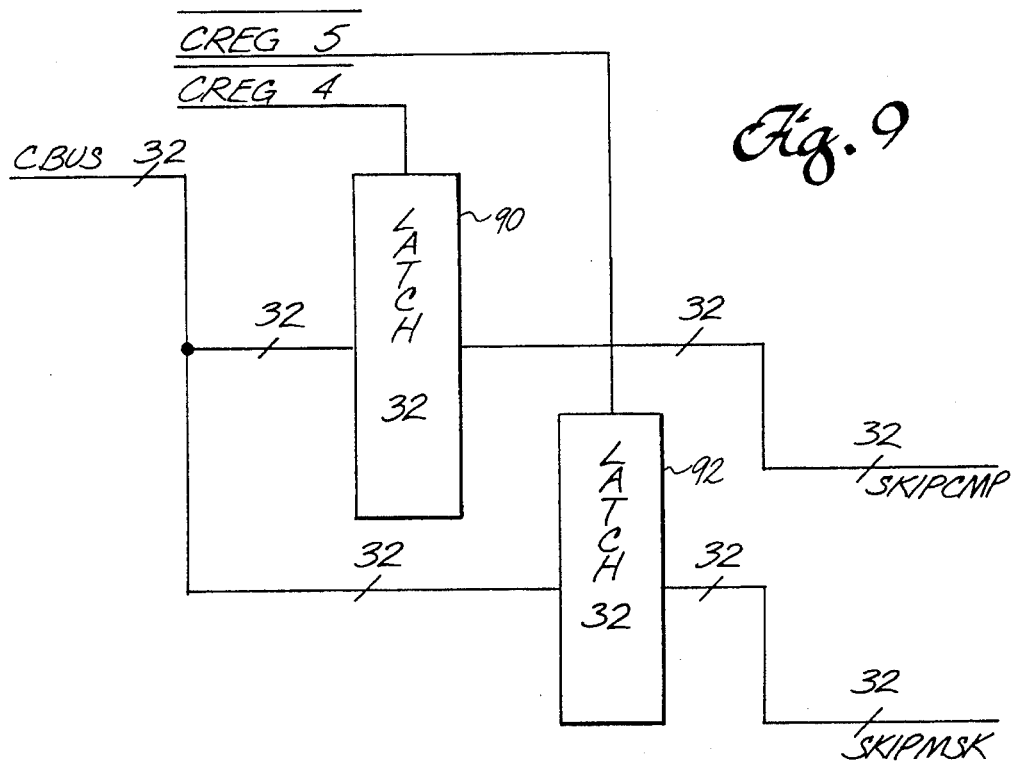
FIG. 9 is a block diagram of the registers for storage of ship control information.

FIG. 9 shows the skip compare and skip mask registers which comprise 32 bit latches 90 and 92. Four skip compare characters comprising 32 bits are provided from latch 90 on SKIPCMP while 32 bits of skip mask characters are provided from latch 92 on SKIPMSK. Latching of the skip compare register is accomplished by CR bit 4, designated $\overline{CREG4}$, while latching of the skip mask register is provided by bit 5 of the CR, designated $\overline{CREG5}$.

Figure 10:
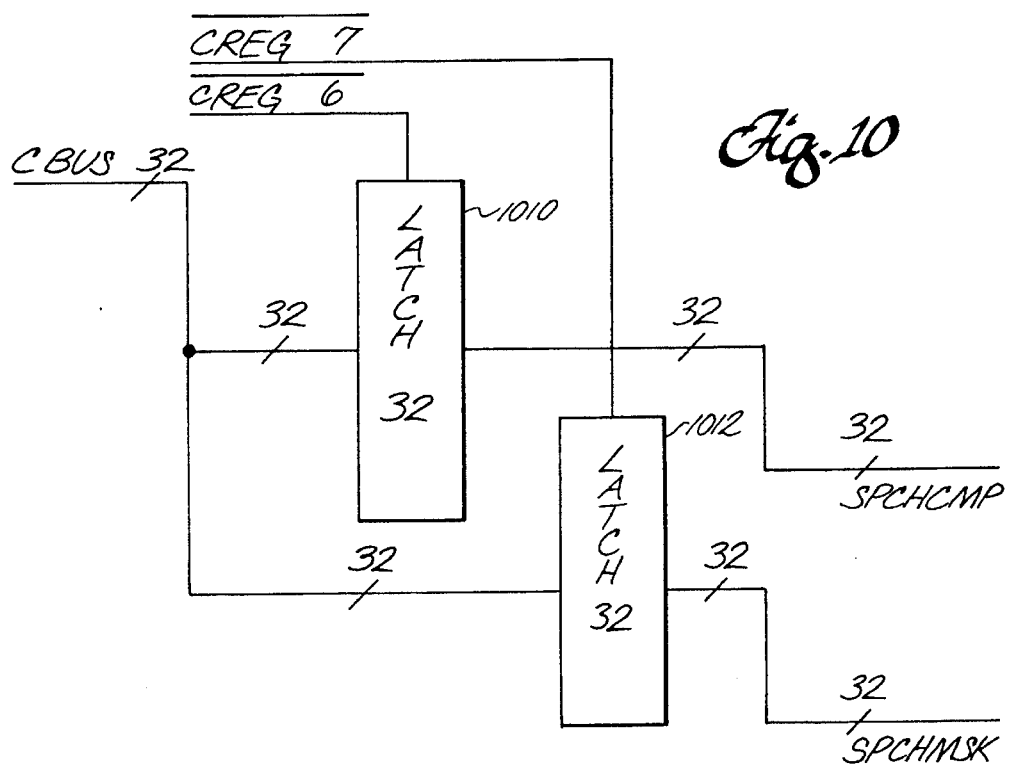
FIG. 10 is a block diagram of the registers for storage of special character information.

FIG. 10 shows the special character compare and special character mask registers. A first latch 1010 stores four special characters for comparison which are provided on output SPCHCMP while latch 1012 receives 32 bits of special character mask bits which are output on SPCHMSK. The special character comparison register is latched by bit 6 of the CR designated $\overline{CREG6}$ while the special character mask register is latched by the seventh bit of the CR designated $\overline{CREG7}$.

Figure 11:
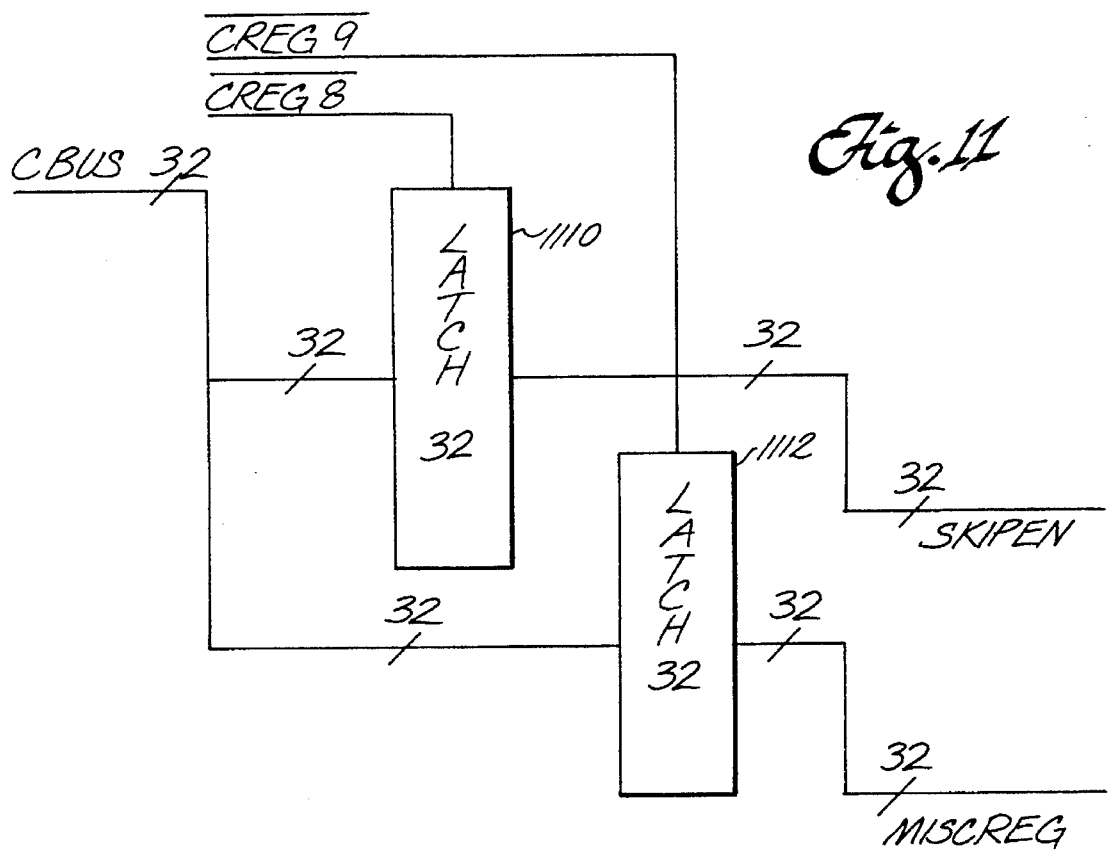
FIG. 11 is a block diagram of the storage registers for skip enable commands and miscellaneous comparison characters/commands.

The skip enable register and miscellaneous controls register are shown in FIG. 11. A first latch 1110 receives the skip enable signals from the CBUS providing 32 bits of skip enable output on SKIPEN. Similarly, 32 bits of miscellaneous control signals are received in latch 1112 and provided for output on MISCREG. Control of the skip enable register is accomplished by the eighth bit of the CR, designated $\overline{CREG8}$ while control of the miscellaneous register is provided by the ninth bit of the CR designated $\overline{CREG9}$.

Figure 12:
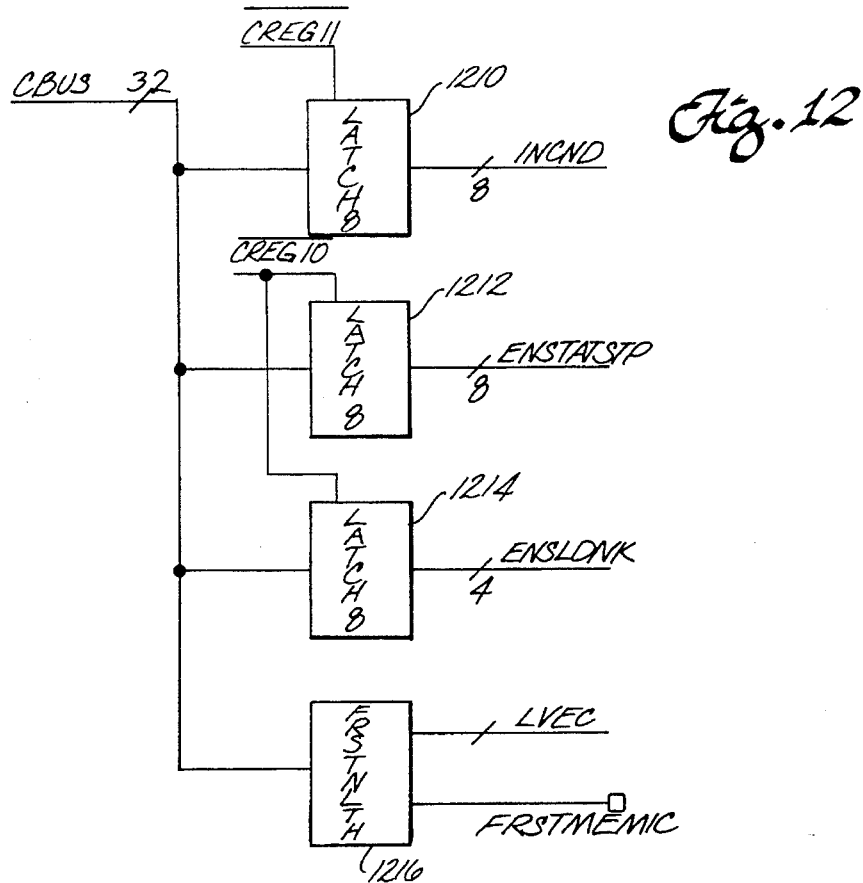
FIG. 12 is a block diagram of the registers for storage of initial conditions, start-stop enable and slam dunk enable and the decoder circuit for the length vector and first memory interface chip designator.

Initial conditions for operation of the MEMIC, enable bits for the start, stop and slam dunk characters, as well as the definition of the length vector and first MEMIC designation, are provided by register shown in FIG. 12. Eight bits of initial condition information are provided to latch 1210 from the CBUS and output on INCND. Similarly, enable start and stop command signals are provided to latch 1212 from the CBUS and provided on output ENSTRTSTP. Enabling the slam dunk character is accomplished by latch 1214 which receives eight bits from the CBUS and provides an output on ENSLDUNK. The length vector for the target string and first MEMIC designation are provided by the first and length circuit (FRSTLNTH) 1216 which is shown in detail in FIG. 13. Latching of the initial condition register is accomplished by CR bit 11, designated $\overline{CREG11}$. Latching of the enable start, stop and enable slam dunk registers is accomplished by bit 10 of the CR, designated $\overline{CREG10}$.

Figure 13:
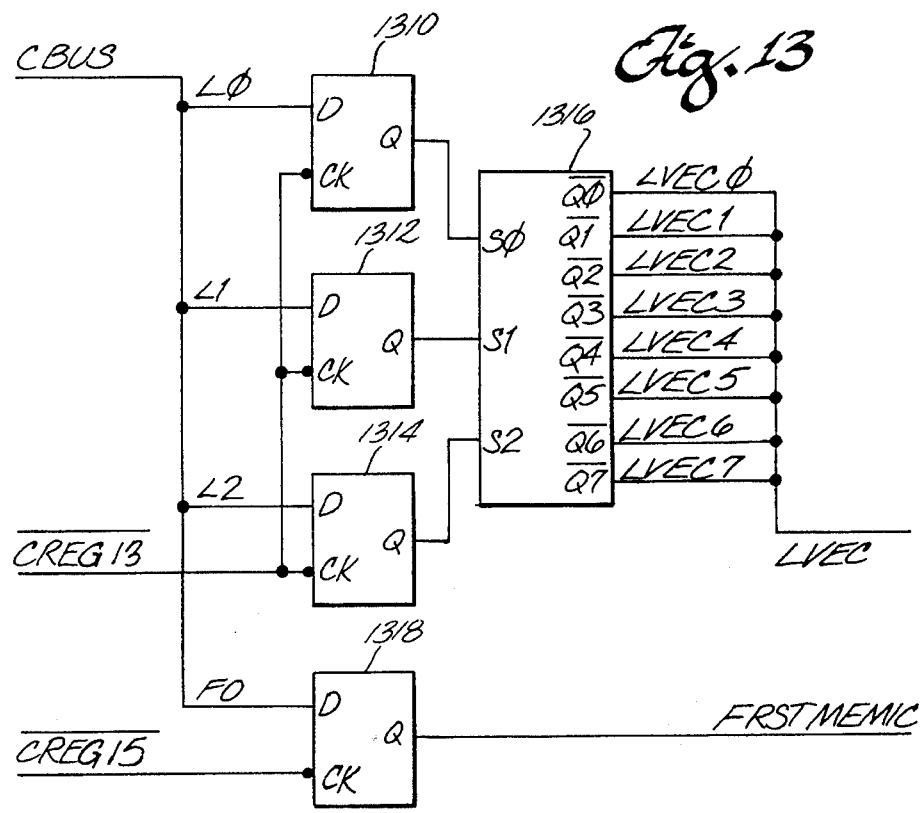
FIG. 13 is a detailed block diagram of the length vector decoder and first memory interface chip designator of FIG. 12.

As shown in FIG. 13, the FRSTLNTH register comprises three flip flops 1310, 1312 and 1314 which capture three bits L0 through L1 designating the number of characters in the search string. A three to eight decoder 1316 decodes the output of the flip flops as an eight bit length vector provided on LVEC. Capture of the length vector is accomplished by bit 13 of the CR, designating $\overline{CREG13}$. A fourth flip flop 1318 receives a first MEMIC designation signal strobed by the fifteenth bit of the CR, designated $\overline{CREG15}$ output of the flip flop 1216 is provided as the FRSTMEMIC signal whose operation will be described in greater detail subsequently.

Figure 14:
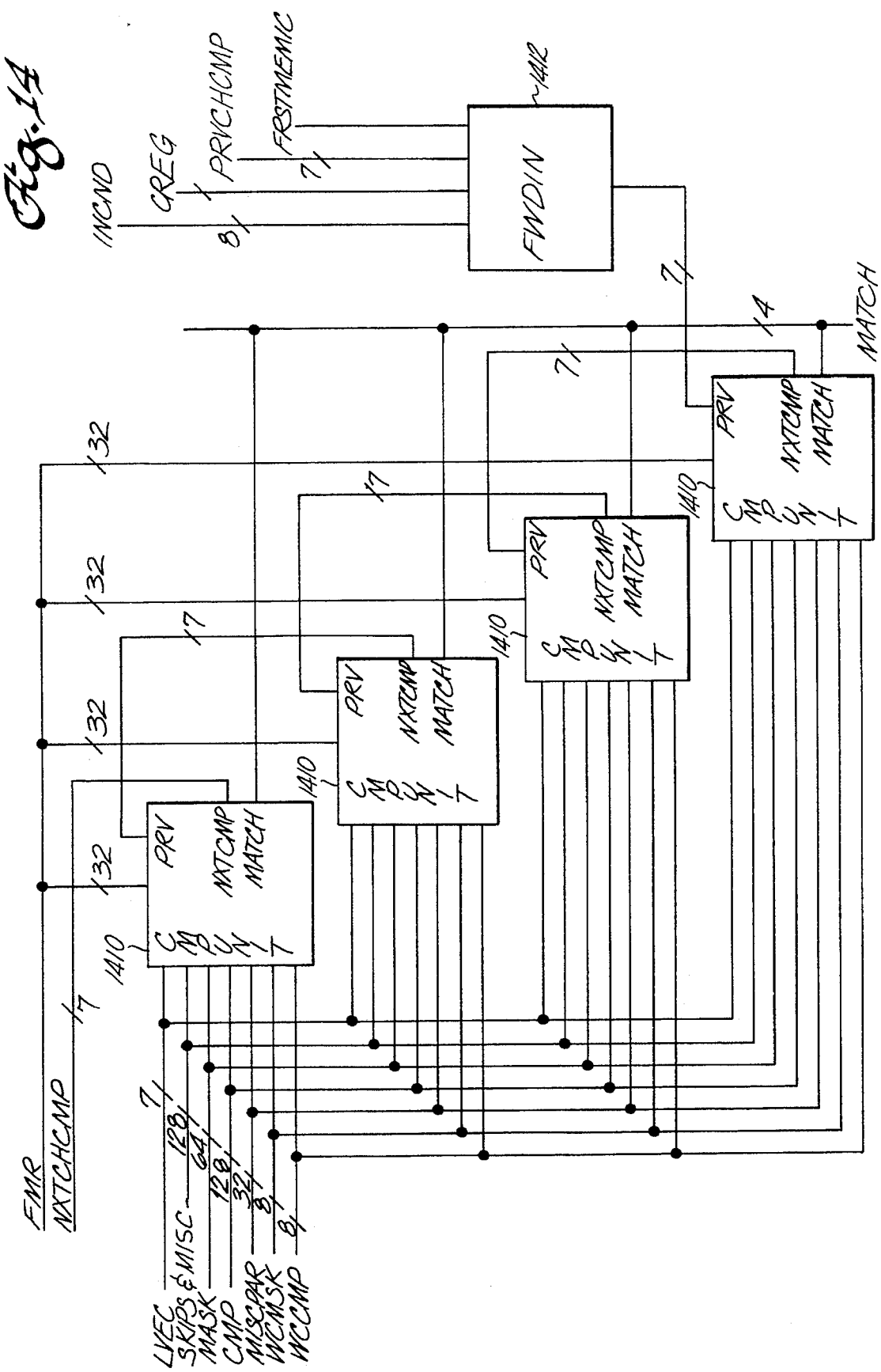
FIG. 14 is a detailed block diagram of the search unit of FIG.4.

The details of the search unit of FIG. 4 are shown in FIG. 14. FIG. 14 is a detailed block diagram of the search unit (SCHUNIT) of FIG. 4. The major components of the SCHUNIT comprise compare units (CMPUNIT) 1410 and a forwarding and initial condition circuit (FWDIN) 1412. Each of the CMPUNIT's receives from the registers the target string CMP of eight characters and length vector LVEC and data for masking (MSK), skip enable, skip characters and miscellaneous (SKIPS & MISC) and wild card character information (WCCMP, WCMSK, WCVECT). Each CMPUNIT also receives, from the memory register, FMR data of four characters to be compared to the target string. In FIG. 14 inputs to the CMPUNIT identified as MISCPAR showing 32 input lines are miscellaneous parameters including WCVECT (16 bits) CUINV (8 bits) and CUMSKN (8 bits) which are discussed in greater detail with respect to FIG. 15.

Figure 15:
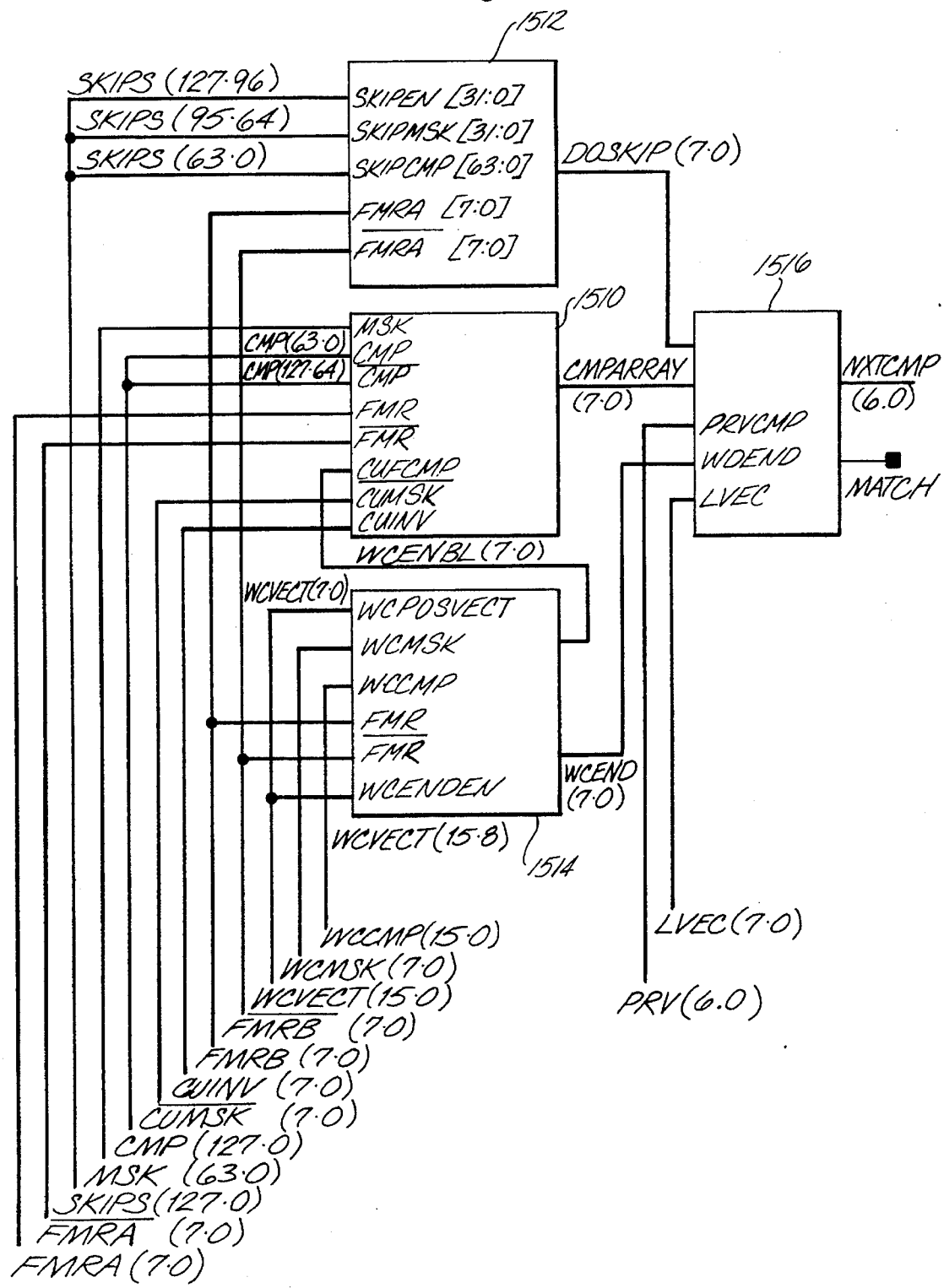
FIG. 15 is a detailed block diagram of the comparison units of FIG. 14.

The CMPUNIT provides the logic for the basic AND function cascade described with regard to FIG. 3, which provides feed forward of comparison hits in the system. FIG. 15 shows the CMPUNIT in greater detail as comprising a comparison array (CMPARRRAY) 1510, a skip array (SKPARRAY) 1512, a wild card comparison array (WC) 1514 and a forward comparison unit (FWDCMP) 1516. The primary comparison of data in the search is accomplished in the CMPARRAY, which is shown in detail in FIG. 16.

Figure 16:
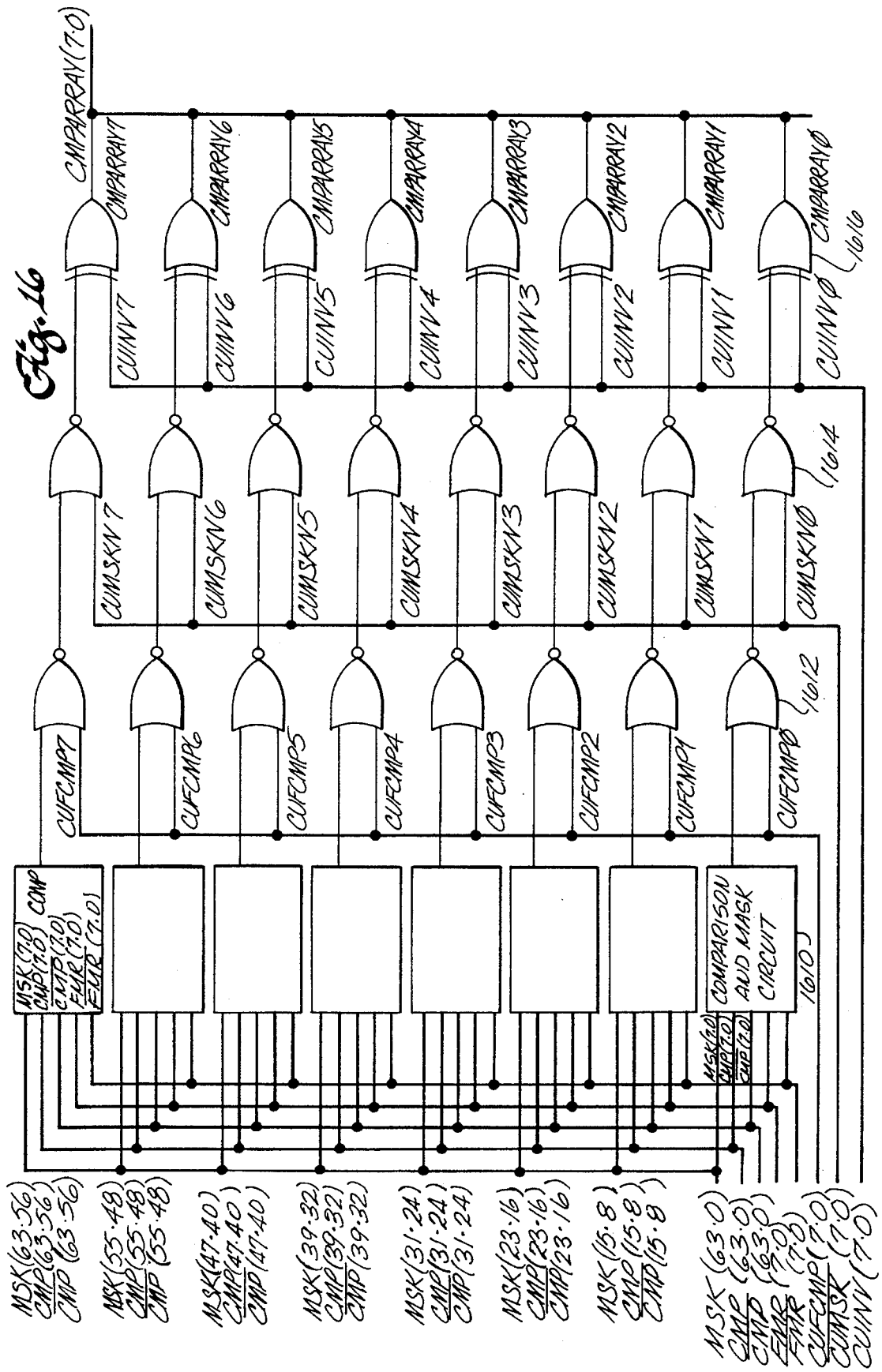
FIG. 16 is a detailed logic diagram of the comparison array of FIG. 15.
Figure 17:
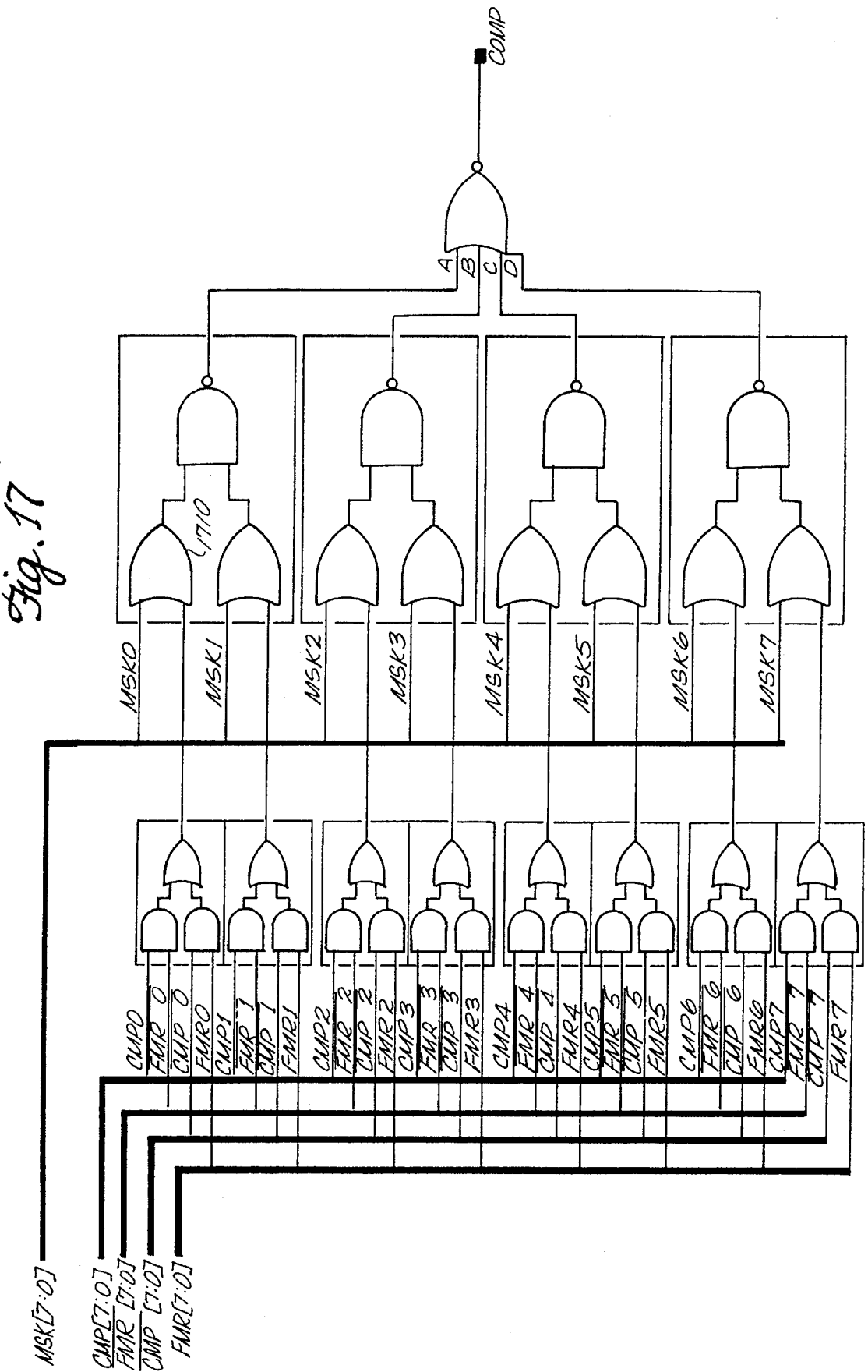
FIG. 17 is a detailed block diagram of the compare and mask circuit employed by the present invention.

The CMPARRAY receives the CMP and FMR data, as well as masking data (MSK), in eight bit comparison and mask circuits (CMPMSK) 1610. The CMPMSK comprise standard bit masking comparators available in chip development libraries. The CMPARRAY provides eight simultaneous compares of any character being searched. As shown in detail in FIG. 17, each CMPMSK of the CMPARRAY receives one character of the target string from CMP and one character of compare data from the memory register FMR. Each bit of the character is provided to an OR gate 1710 which receives the associated mask bit MSK0 through MSK7. The presence of a positive mask bit forces the comparison true for that bit of the character comparison. The output of the CMPMSK unit is a positive comparison signal COMP. As shown in FIG. 16, the comparison signal from each CMPMSK unit is provided through NOR gate arrays 1612 and 1614, and EXOR gate array 16, wherein signal arrays CUFCMP, $\overline{CUMSK}$ and CUINV, respectively, may force a positive compare. The output of the CMPARRAY is provided to the FWDCMP unit 1516 (FIG. 15) for further processing. Via $\overline{CUMSK}$ and CUINV, each CMPUNIT is programmable to non-compare, always compare or compare on "not" (providing a positive comparison for 0-1).

Figure 18:
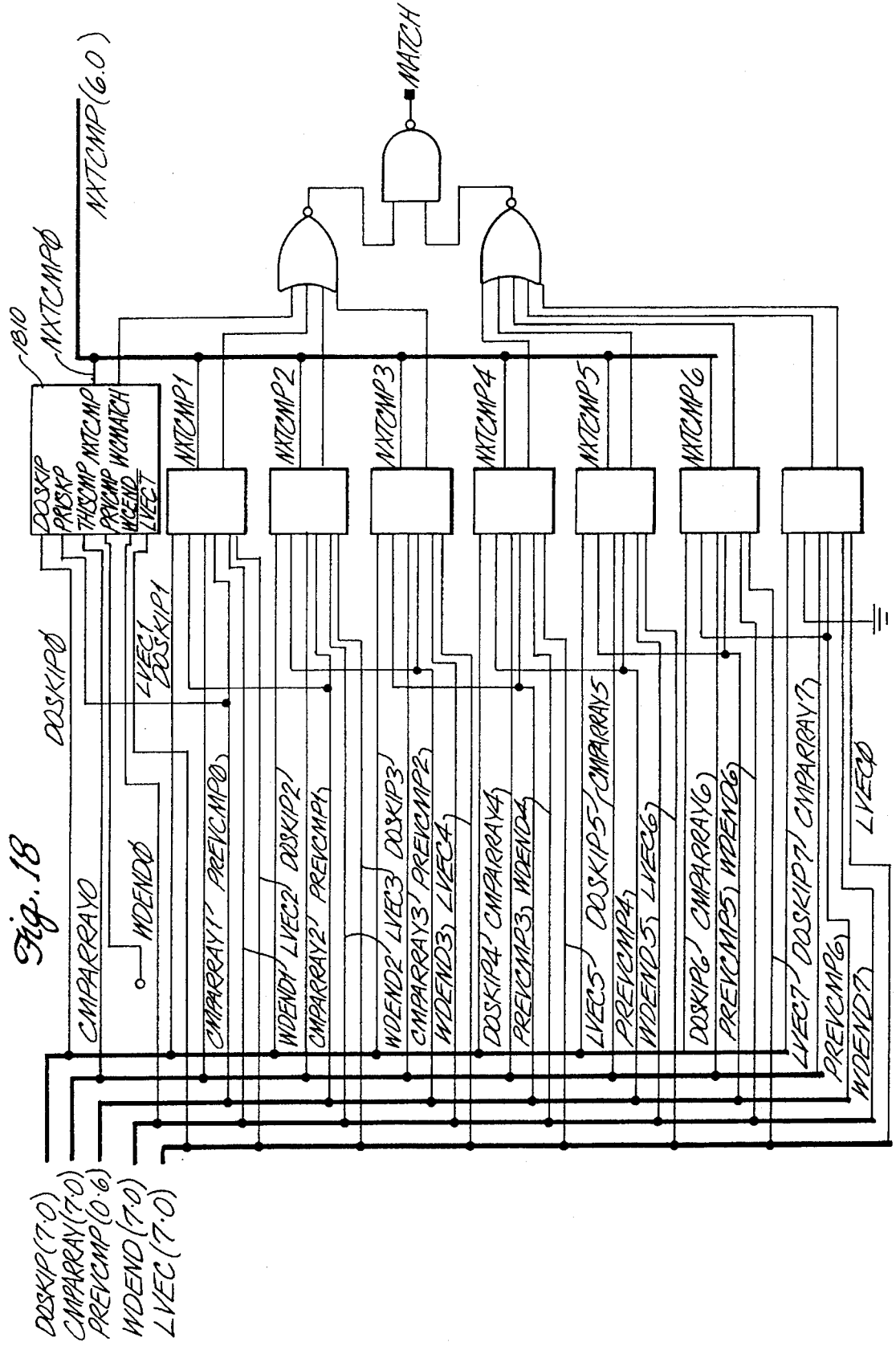
FIG. 18 is a detailed block diagram of the forward comparison unit of FIG. 15.
Figure 19:
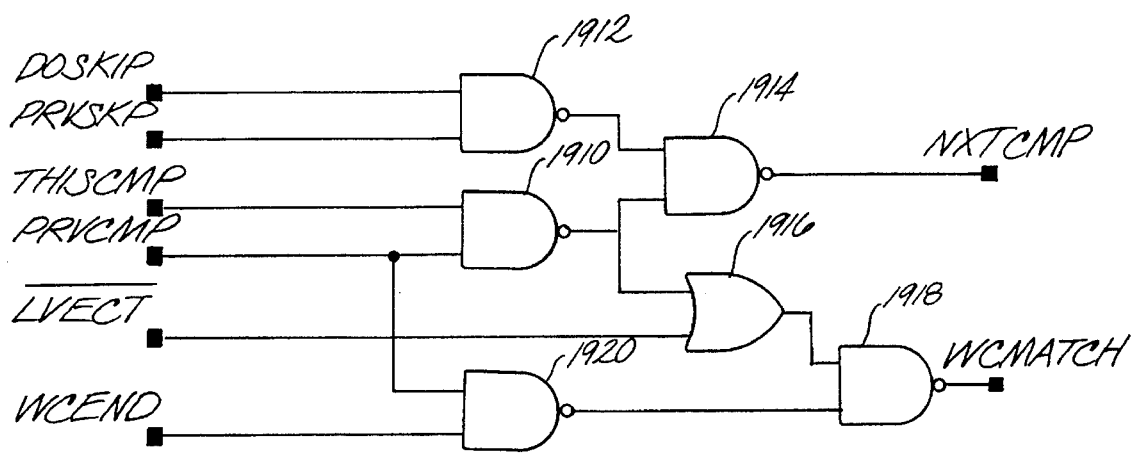
FIG. 19 is a detailed logic diagram of the forward compare element of FIG. 18.

As shown in FIG. 18, the FWDCMP unit receives the results of the CMPARRAY unit and the results of the SKPARRAY and WC which will be described in greater detail subsequently. The FWDCMP incorporates forward compare elements FWDCELMT 1810 for assessment of the CMPARRAY results. The FWDCELMT is described in detail in FIG. 19. Each FWDCELMT receives the results of the character comparison as THISCMP in NAND gate 1910. In addition, data on the comparison of the prior character is received as PRVCMP in NAND gate 1910. A positive result of both compares is required for forwarding to the next AND function element in the cascade. Alternatively, if a skip character has been compared, results are received and signal DOSKIP and PRVSKIP are received by NAND gate 1912, which also provides a true output for passing to the next AND function in the cascade. The results of the skip comparison and character comparison are provided through NAND gate 1914 as the NXTCMP signal for the next element in the cascade. As previously described, the length vector LVEC is provided for target strings having fewer than eight characters. A true signal on $\overline{LVECT}$ provided through OR gate 1916 results in a match output from NAND gate 1918 of the FWDCELMT. Similarly, if a wild card character resulting in a termination of the search has received a positive compare, the WCEND signal provided through NAND gate 1920 also forces a match signal in the FWDCELMT.

Figure 20:
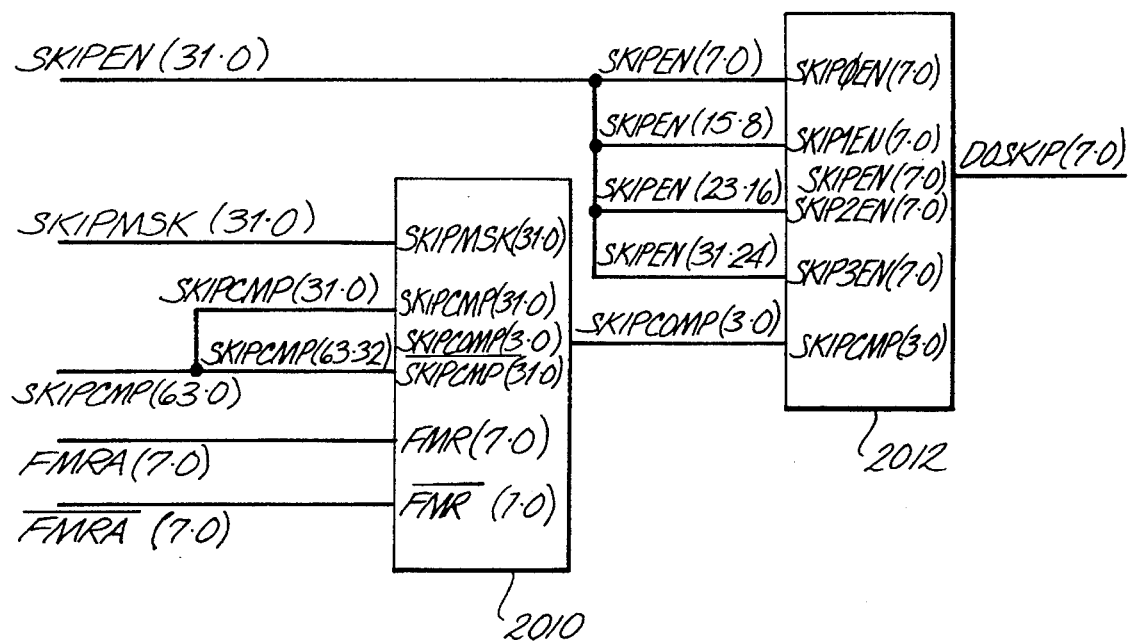
FIG. 20 is a detailed block diagram of the skip array of FIG. 15.

The SKPARRAY and WC array providing signals to the FWDCMP unit operate similarly to the CMPARRAY. The SKPARRAY is shown in detail in FIG. 20. As previously described, skip characters are provided to allow flexibility in searching where data formatting may result in character insertion in data being compared to a target string. Exemplary of such instances are hyphenated words (potentially followed by carriage return and line feed characters) in word processing applications. The SKPARRAY allows comparison of various skip characters stored in the SKIPCMP register with characters from the memory register FMR in the skip compare circuit SKIPCMP 2010. In addition, masking bits to allow flexibility in the skip characters are provided from the SKIPMSK register.

Figure 21:
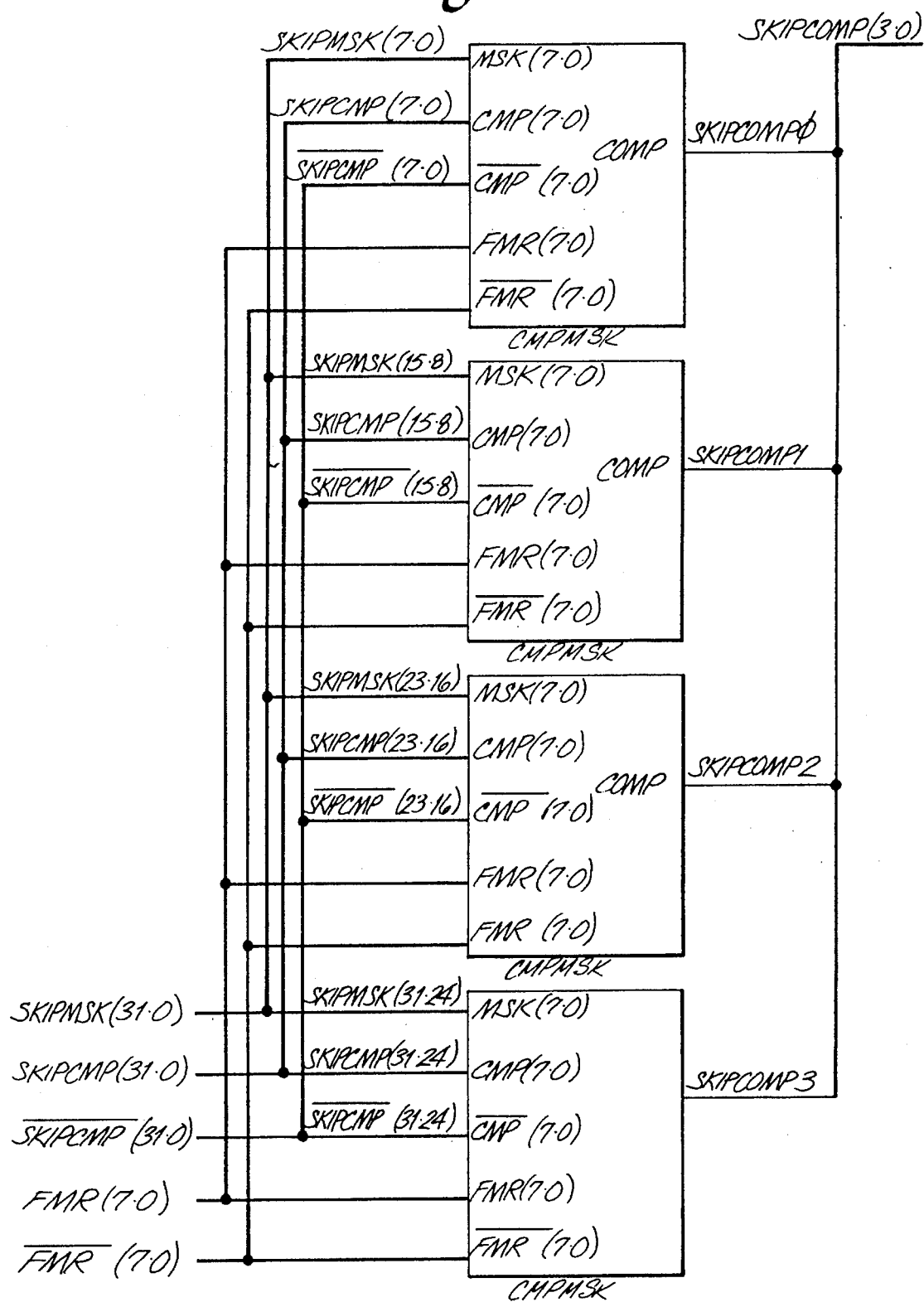
FIG. 21 is a detailed block diagram of the skip compare of FIG. 20.

The SKIPCMP is described in detail in FIG. 21. CMPMSK units as previously described with respect to the CMPARRAY are employed for the skip comparison. The results of the skid comparison are provided as positive compare signals SKIPCOMP.

Figure 22:
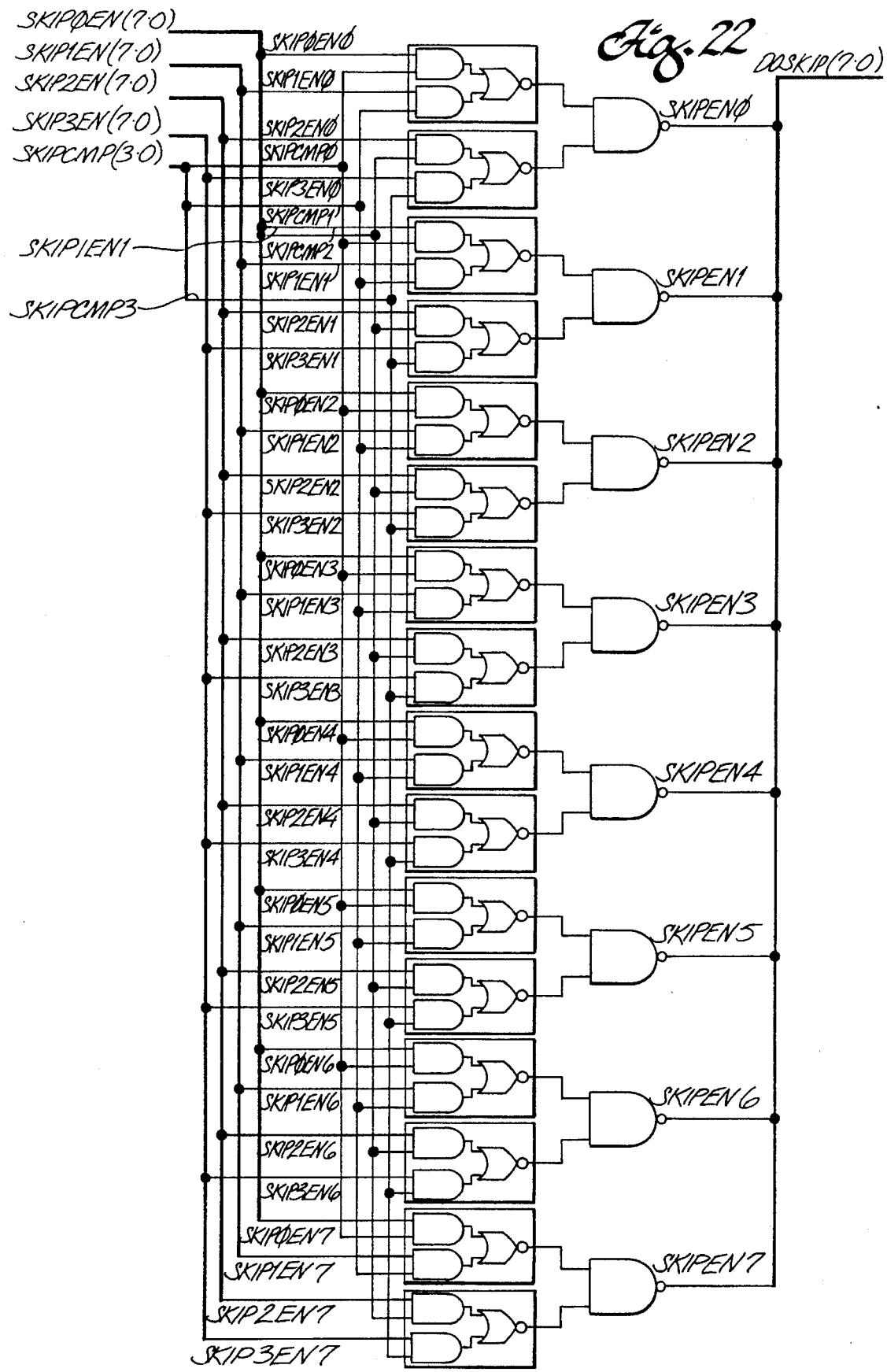
FIG. 22 is a detailed logic diagram of the skip enable of FIG. 20.

Further flexibility is provided in the SKPARRAY through a skip enable matrix SKIPENMX 2012 (shown in FIG. 20) receiving the results of the skip comparison from the SKIPCMP and skip enable data SKIPEN. The details of the SKIPENMX are shown in FIG. 22. The SKIPEN signals comprise the skip enable vector which is invoked in addition to specifying the skip character itself. In the embodiment shown in the drawings, assignment of a skip character to the third position of a search string is accomplished by specifying the SKIPEN vector as a binary 00000010. As shown in the drawings this provides the following hardware effect.

if a skip character is detected for a position, it simply forces the previous compare back one position. As an example, if the target string comprises the abbreviation for Christmas, XMAS, then a positive comparison of each character will be transferred through the FWDCMP units of the MEMIC. The first character (least significant character) S produces a compare which combined with the second character A will produce a two character compare which with the third character M will produce a third character compare and finally combined with the match of the X in the fourth character will produce a fourth character compare resulting in a match (as previously described the LVEC would be set for a four character target string). An alternative abbreviation for XMAS might be X-MAS for which a positive compare would also be desired. In this case, the "–" would be designated as a skip character. The target string XMAS would then be designated and a skip character hyphen designated. Up to and including the third character of the search comparison, positive comparison results are received as previously described. However, upon reaching the skip character "–" the hardware causes the fourth character to be ignored by gating the result of the prior comparison produced by MAS. In this fashion, the fifth character X sees an indicator which it cannot differentiate from a positive comparison of MAS. With regard to the comparison input for the character X, the previous results for comparison of MAS or -MAS are equivalent.

The skip enable vector for the hyphen in X-MAS forces the fourth comparison character back one position. Multiple skip characters are applied in a similar way. For instance, if we allow two skip characters, say "–" and "=" in character positions 3 and 4, the hardware result of the comparisons forces the hyphen character into position two meaning that position two assumes the prior comparison results given by a skip enable vector 02. However, the second skip character "=" also forces a comparison transfer into position two, meaning that its skip enable vector is also 02. A total of 7 skip enables are provided through the skip enable vector.

The SKIPENMX shown in detail in FIG. 22 implements the skip comparison as described providing the DOSKIP signal output employed in the FWDCELMT previously described. The feed forward of the PRVSKP data to the FWDCELMT is shown schematically in FIG. 18 for the consecutive comparison elements of the FWDCMP.

Figure 23:
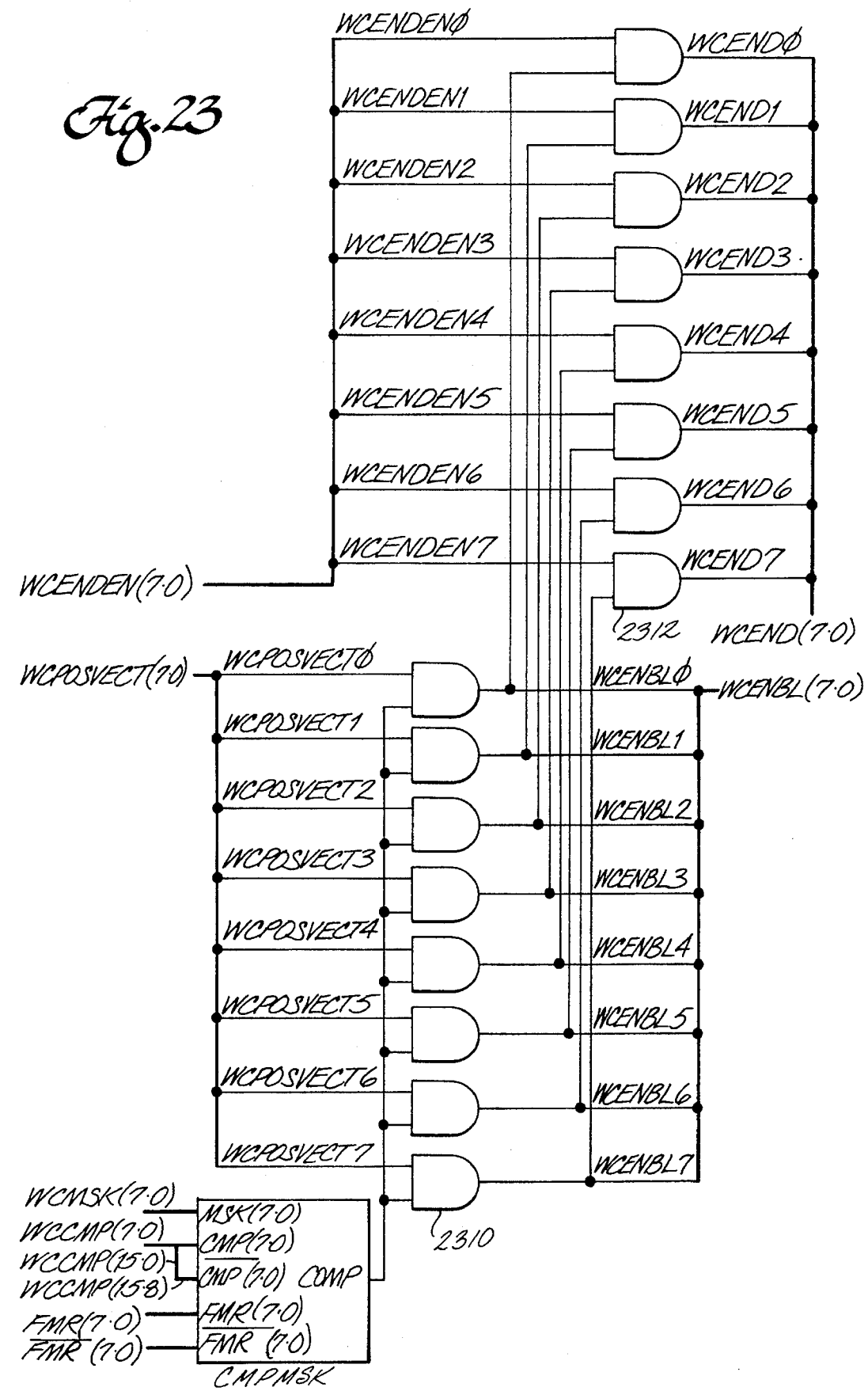
FIG. 23 is a detailed logic diagram of the wild-card comparison circuit of FIG. 15.

Again, similar to the CMPARRAY, the WC array compares wild card characters from the WCCMP register with data from the memory register FMR in a CMPMSK circuit as shown in detail in FIG. 23. The position vector for the wild card, WCPOSVCT, combined with the results of the CMPMSK through AND gates 2310 results in the output of the wild card enable signal WCENBL. As shown in FIG. 15, WCENBL is provided to the CMPARRAY as signals CUFCMP forcing a positive compare through NOR gates 1612 (FIG. 16) for a positive wild card compare. In addition, the WCENBL signals in combination with the wild card end enable signals WCENDEN through AND gates 2312 (FIG. 23) result in output of the wild card end signals WCEND provided to the FWDCMP as the WDEND signals, as shown in FIGS. 15 and 18 which in turn are employed as the WCEND signal in the FWDCELMT for determining a match output as a result of a wild card character positive compare in combination with wild card termination of the search. (Further characters in the text string being ignored).

The data forwarding and initial condition circuit FWDIN of FIG. 14 is shown in detail in FIG. 24. As shown in FIG. 14, the comparison data PRVCHCMP from the previous MEMIC is input to the FWDIN circuit of the MEMIC thereby avoiding MEMIC boundaries in the comparison. PRVCHCMP is provided as shown in FIG. 24 to the forward initializing circuit FWDINIT 2410. In addition, the FWDINIT receives the initial condition signals INCND provided by the microprocessor allowing initial conditions to be set for comparisons crossing page or block boundaries in memory or other conditions which the programmer may determine.

Figure 25:
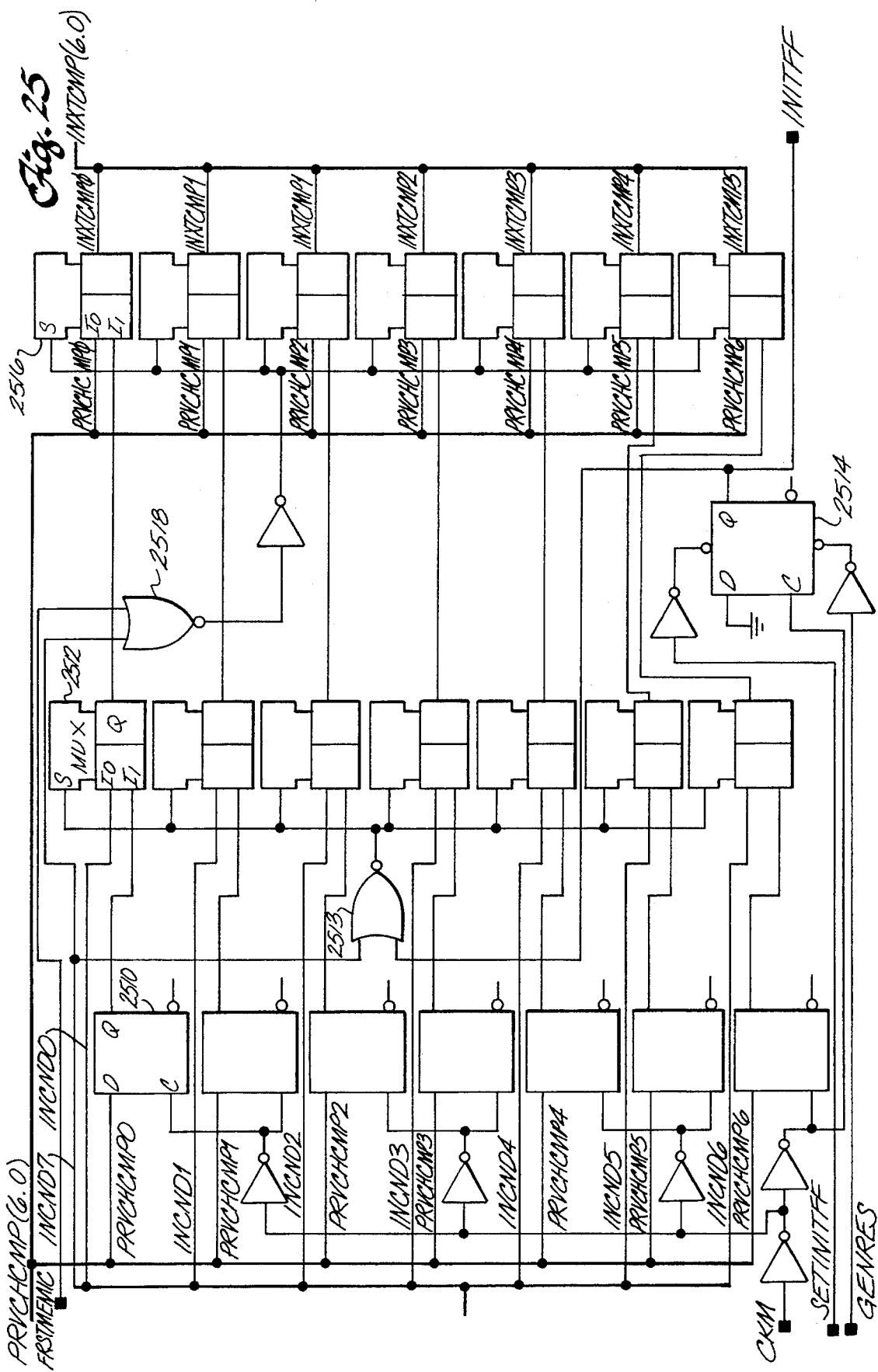
FIG. 25 is a detailed logic diagram of the data forwarding and initialization circuit of FIG. 24.

Details of the FWDINIT are shown in FIG. 25. PRVCHCMP signals are provided to flip-flops 2510 which provide signal outputs to a plurality of multiplexers 2512 which also receive the initial condition signals INCND. Selection by the multiplexers is accomplished by NOR gate 2513 which receives the MSB for INCD and the initial flip-flop signal INITFF provided by flip-flop 2514 which is in turn set by an additional initial condition signal for setting the initial flip-flop SETINITFF. A second set of multiplexers 2516 receives the output of the first selectors/multiplexers 2512 on one input and the previous character compare signals PRVCHCMP on the second input. Selection is accomplished through NOR gate 2518 receiving the MSB of the initial condition signals INCND and the first MEMIC signal FRSTMEMIC designating the chip as the first MEMIC, thereby requiring initial conditions to be determined by the microprocessor. As previously noted, the first selectors 2512 provide either set initial conditions or the previous channel compare depending on the SETINITFF signal. The output of the second selectors 2516 is provided as the internal next compare signal INXTCMP, which, as shown in FIG. 24, is provided as the previous comparison data PRVCMP, which, as shown in FIG. 14, is provided to the first comparison unit CMPUNIT of the MEMIC.

Returning to FIG. 24, the next character comparison data NXTCHCMP, as well as the previous comparison data PRVCMP, is provided for status outputs to the microprocessor. As shown in FIG. 14, the NXTCHCMP data is provided to the next MEMIC as an output from the scheduling unit SCHUNIT shown in FIG. 4 as NEXT.

Figure 26:
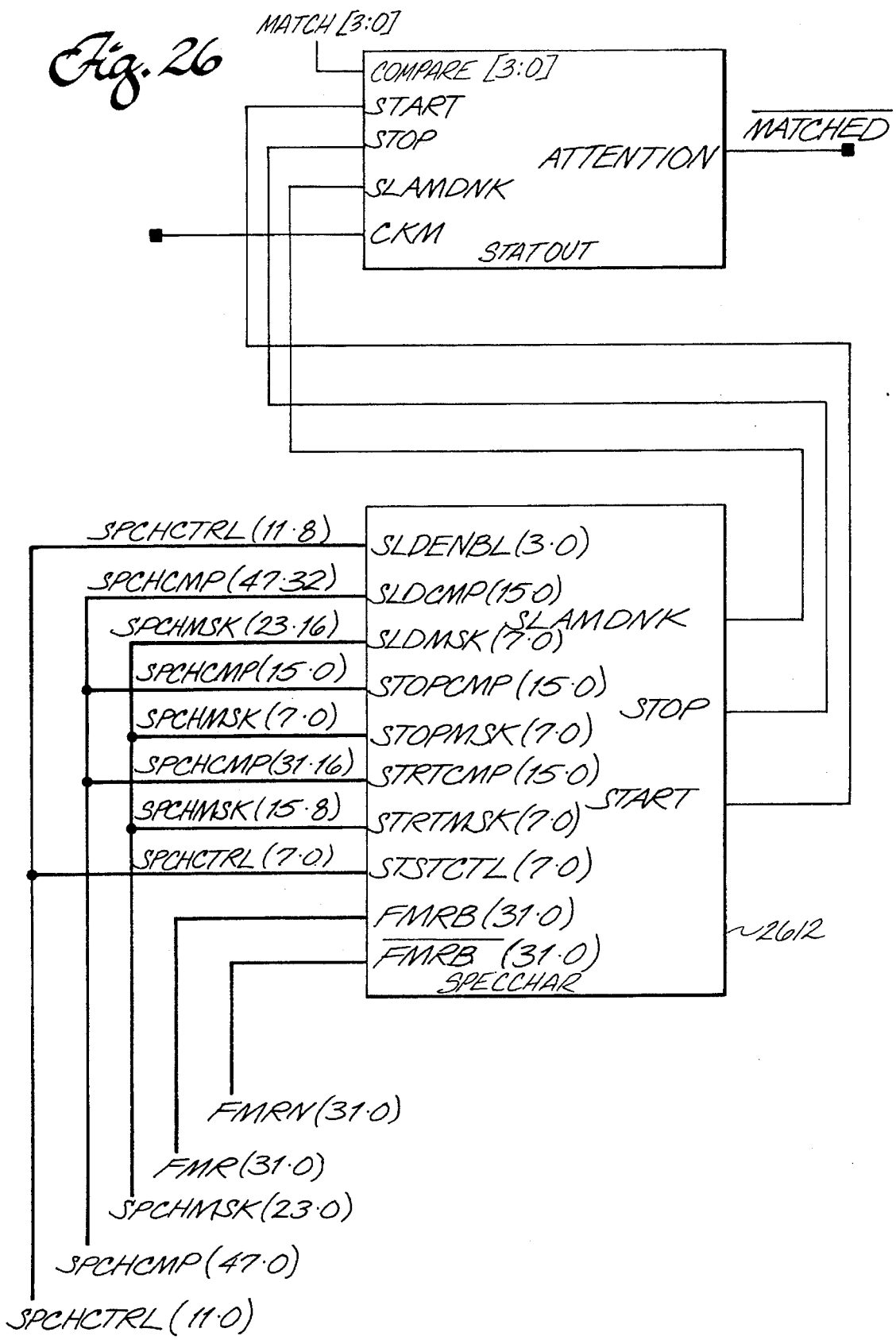
FIG. 26 is a detailed block diagram of the results circuit of FIG. 4.

The RESULT circuit of FIG. 4 is shown in greater detail in FIG. 26. The match data from each CMPUNIT of the SCHUNIT in the MEMIC (as shown in FIG. 14) is provided to the status output circuit STATOUT in the result circuit. As will be described in greater detail subsequently, a positive comparison on any one of the four CMPUNIT circuits provides a matched signal $\overline{\text{MATCHED}}$ signaling to the microprocessor that a match to the target string has been accomplished.

Figure 27:
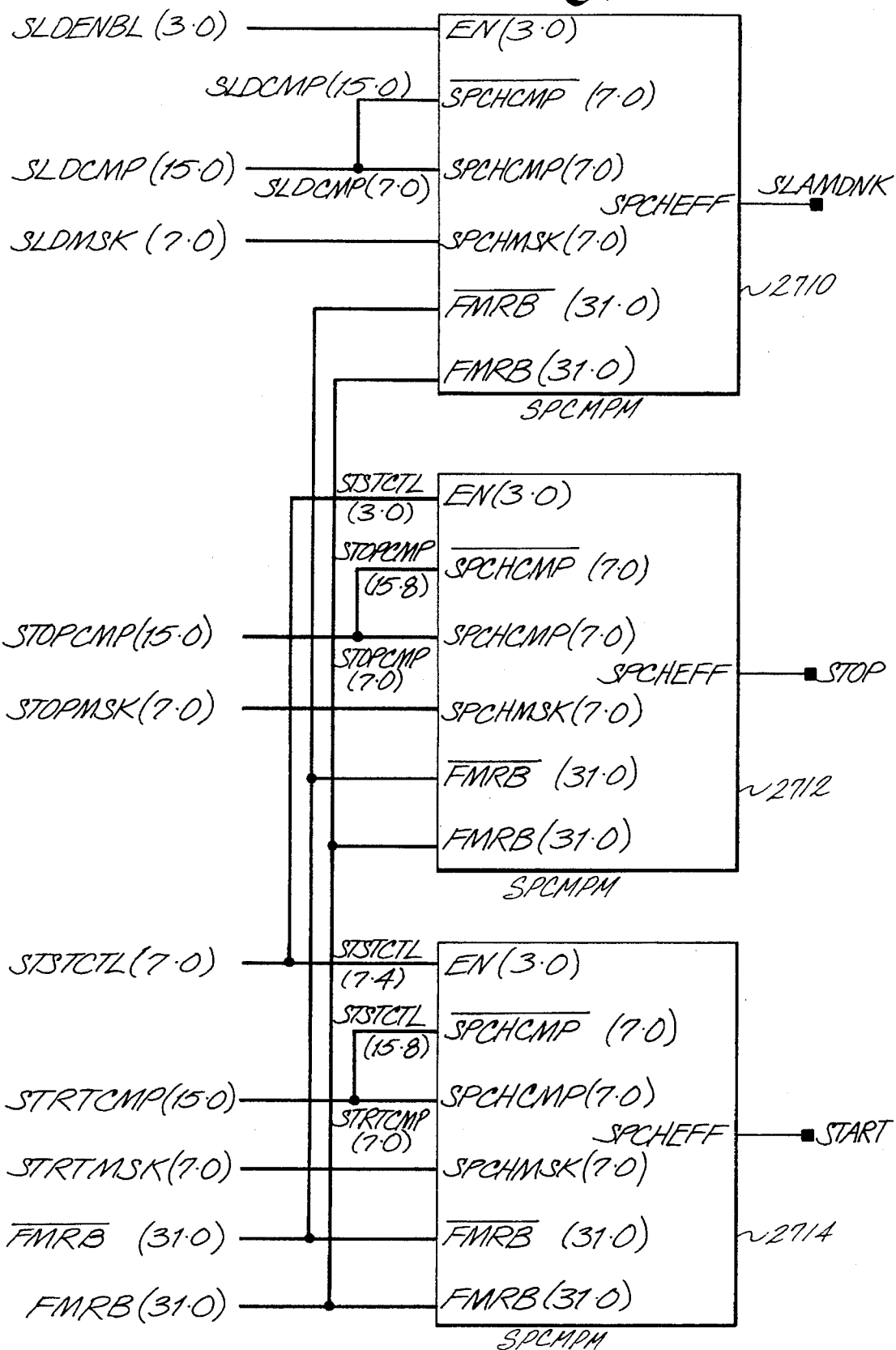
FIG. 27 is a block diagram of the special character control generation circuits of FIG. 26.
Figure 28:
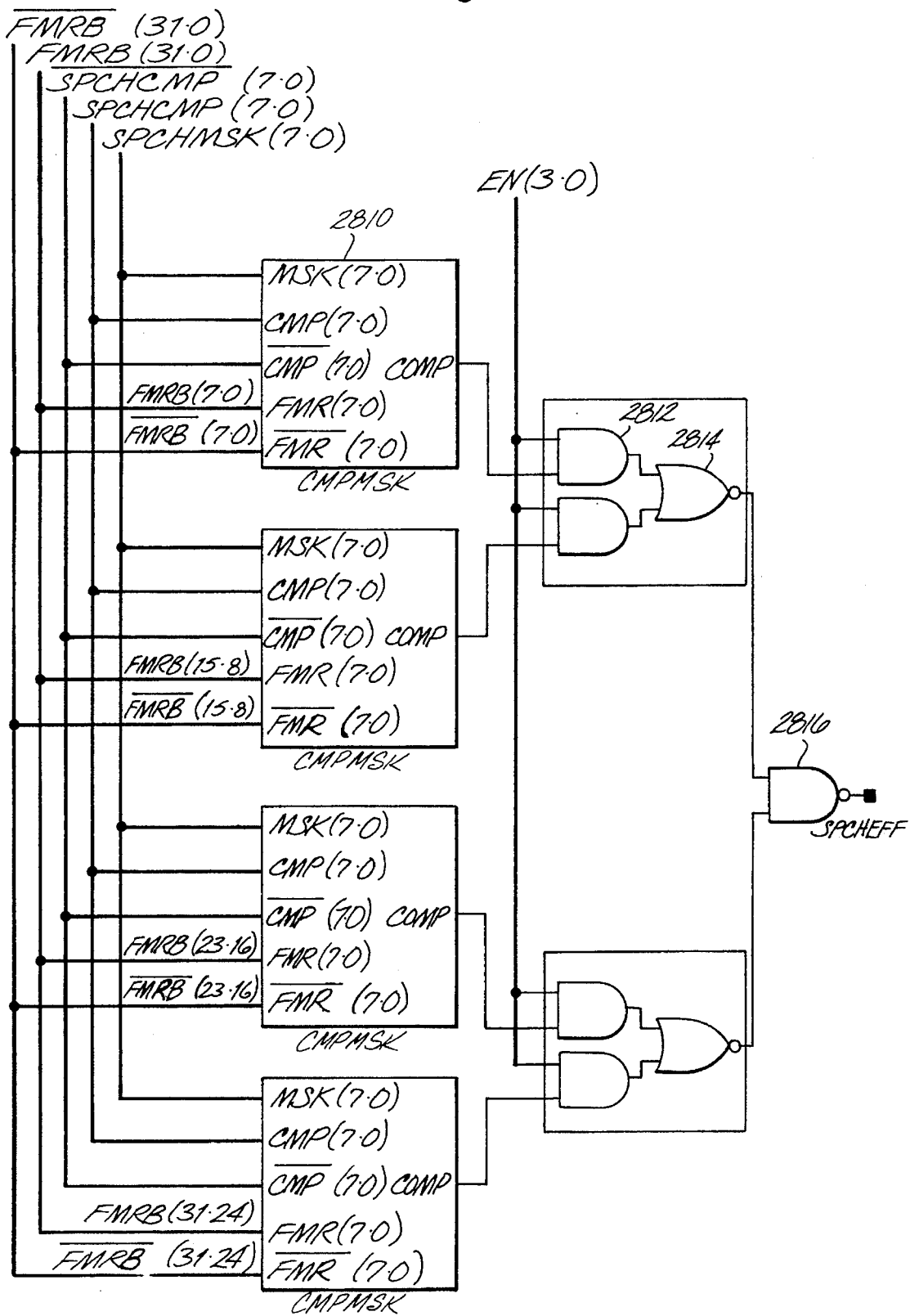
FIG. 28 is a detailed logic diagram of the special character compare matrix of FIG. 27.

In addition, the RESULT circuit incorporates the special characters recognition circuit SPECCHAR 2612 which receives the special character control, compare and masking data SPCHCTRL, SPCHCMP, and SPCHMSK, respectively. As shown in detail in FIG. 27, the SPECCHAR comprises three separate comparisons circuits SPCMPM for the slam dunk character, stop character and start character designated 2710, 2712 and 2714, respectively. Each SPCMPM receives the appropriate special character control signals, compare signals and mask signals and provides an output for a positive compare. Each SPCMPM comprises a circuit as shown in detail in FIG. 28. The special character comparison and mask data is provided to a CMPMSK circuit as previously described in FIG. 17 which compares the data in the memory registers FMR. Comparison outputs from the CMPMSK are provided to AND gates 2812 having outputs which are, in turn, connected to the inputs of NOR gates 2814. A positive compare in any CMPMSK will result in a true signal to NAND gate 2816 providing a true output for the special character match SPCHEFF.

As shown in detail in FIG. 29, the special character outputs are provided to the STATOUT circuits along with the MATCH data, carried internally as the COMPARE data. The start and stop character outputs are provided to a JK flip-flop 2910 which enables or disables AND gates 2912 for transmission of the COMPARE data. If enabled, the COMPARE data is latched in flip-flops 2914. A positive compare in any of the CMPUNIT's, as latched in the flip-flops 2914, results in a true output from NOR gate 2916. AND gate 2918 receives the $\overline{\text{ATTENTION}}$ signal from the NOR gate and the output from flip-flop 2918 which receives a positive result from the slam dunk special character comparison. Thus, a true compare from any of the comparison units or the slam dunk character will be recognized as a match and output by the output circuit as the $\overline{\text{MATCHED}}$ signal. The start, stop and slam dunk characters yield a character match regardless of location in the characters compared from memory. If enabled, these character comparisons are not conditioned upon any prior comparison as with text string comparisons, in the MEMICS, thereby providing added flexibility in control of the search process or specific character detection in addition to the search process. For example, the slam dunk character may be employed when searching for fixed word sizes in a table, allowing termination upon a match occurring in the table, or when a certain pattern exists in the bits comprising the slam dunk character (for example, a 32 bit "long"). Masking of the data is particularly useful with the slam dunk character by allowing comparison with only a single bit (for example, the most significant bit of the 32 bit "long"). The start and stop characters are used to directly affect the search process by enabling or disabling the match detection circuitry. When the stop character is detected, the match circuitry is disabled (though prior matches are retained) and is enabled again if the start character is detected for the embodiment shown in the drawings.

Having now described the invention in detail, those skilled in the art will recognize modifications and substitutions to the embodiments disclosed for particular applications. Such modifications and substitutions are within the scope and intent of the invention as defined in the following claims.

What is claimed is:

1. A memory interface chip comprising:

a first register having a first plurality of storage locations for storing a target search string;

a second register having a second plurality of storage locations for receiving data in parallel from a memory;

a first matrix of comparators having a number of rows equal to the first plurality of storage locations and a number of columns equal to the second plurality of storage locations, each comparator receiving a first input from a storage location for the target search string corresponding to the row of that comparator and a second input from a memory data storage location corresponding to the column of that comparator, each comparator providing an output; and a second matrix of AND means, each AND means receiving a first input from one of the comparators in said first matrix and a second input from an AND means one row adjacent and one column adjacent in said second matrix and wherein any of the AND means in said second matrix which receives a positive input from a comparator in a bottom row of said first matrix and a positive input from the AND means one row and one column adjacent provides a match signal for a true condition.

2. A memory interface chip as defined in claim 1 further comprising:

a length register having a plurality of storage locations equal to said first plurality for storing a length vector wherein each comparator in said first matrix receives a fourth input from a length vector storage location corresponding to the row in the first matrix of that comparator; and means for decoding a length input field corresponding to a target search string smaller than said first plurality, said means for decoding outputting the length vector to the length register wherein presence of a bit in the length vector storage location forces a true output from the AND means receiving the output of that comparator.

3. A memory interface chip as defined in claim 1 further comprising:

a third register having a third plurality of storage locations for storing secondary comparison data;

a third matrix of second comparators having a number of rows equal to said third plurality and a number of columns equal to said second plurality, each second comparator receiving a first input from a storage location in said third register for secondary comparison data corresponding to the row in said third matrix of that second comparator and a second input from a memory data storage location in said second register corresponding to the column in said third matrix of that second comparator;

means for generating a position vector connected to the first input of the AND means in the second matrix, receiving the output of that second comparator the generated position vector designating a row in said second matrix to force a true output from the AND means of said row responsive to a positive compare in that second comparator upon receipt by the AND means of a true on the second input of the AND means.

4. A memory interface chip as defined in claim 1 further comprising means for controlling the loading of said target search string into said first plurality of storage locations.

5. A memory interface chip as defined in claim 4 further comprising a mask register having a plurality of storage locations equal to said second plurality for storing mask bits, and wherein each comparator in said first matrix receives a third input from a mask bit storage location in the mask register corresponding to the column in said first matrix of that comparator, and wherein presence of a mask bit on the third input forces a true output from that comparator.

6. A memory interface chip as defined in claim 5 further comprising means for controlling the loading of said mask bits into the storage locations of said mask register.

7. A memory interface chip as defined in claim 1 further comprising a secondary comparison data register having a third plurality of storage locations for storing secondary comparison data;

a third matrix of second comparators having a number of rows equal to said third plurality and a number of columns equal to said second plurality, each second comparator receiving a first input from a storage location for secondary comparison data corresponding to the row in said third matrix of that second comparator and a second input from a memory data storage location corresponding to the column in said third matrix of that second comparator; and a plurality of OR means equal in number to said second plurality and receiving a first input from a first comparator from the first matrix and a corresponding second comparator from the third matrix, said plurality of OR means intermediate said first comparator and the AND means which receives the output from said first comparator.

8. A memory interface chip as defined in claim 7 further comprising:

means for generating a position vector for identifying string position for said secondary comparison data; and means intermediate said corresponding second comparator and said plurality of OR means for gating the output of said corresponding second comparator responsive to the generated position vector, whereby an output of the corresponding AND means indicates a positive comparison by the AND means one row adjacent and one column adjacent.

9. A memory interface chip as defined in claim 8 further comprising END enable means for providing an END enable output resulting in a match signal responsive to a positive comparison in the corresponding second comparator.

* * * * *